United States Patent
Murakami

(10) Patent No.: US 10,530,601 B2
(45) Date of Patent: Jan. 7, 2020

(54) ELECTRONIC APPARATUS AND METHOD

(71) Applicants: Qingdao Hisense Electronics Co., Ltd., Qingdao OT (CN); TOSHIBA VISUAL SOLUTIONS CORPORATION, Misawa-shi, Aomori OT (JP)

(72) Inventor: Masatoshi Murakami, Hamura Tokyo (JP)

(73) Assignees: QINGDAO HISENSE ELECTRONICS CO., LTD., Qingdao (CN); TOSHIBA VISUAL SOLUTIONS CORPORATION, Misawa-Shi (JP)

( * ) Notice: Subject to any disclaimer, the term of this patent is extended or adjusted under 35 U.S.C. 154(b) by 4 days.

(21) Appl. No.: 15/857,288

(22) Filed: Dec. 28, 2017

(65) Prior Publication Data

US 2018/0343138 A1    Nov. 29, 2018

(30) Foreign Application Priority Data

May 23, 2017    (JP) ................. 2017-101880

(51) Int. Cl.
*H04M 1/00* (2006.01)
*H04L 12/28* (2006.01)
(Continued)

(52) U.S. Cl.
CPC ......... *H04L 12/282* (2013.01); *H04B 1/3827* (2013.01); *H04L 12/281* (2013.01);
(Continued)

(58) Field of Classification Search
CPC ......... H04W 4/80; H04W 88/02; H04W 8/22; H04W 4/06; H04L 12/282; H04L 12/2805; H04L 12/281; H04L 12/2818
See application file for complete search history.

(56) References Cited

U.S. PATENT DOCUMENTS

| 6,167,251 A | 12/2000 | Segal et al. |
| 6,836,651 B2 | 12/2004 | Segal et al. |

(Continued)

FOREIGN PATENT DOCUMENTS

| EP | 3110118 A1 | 12/2016 |
| JP | 2002-33839 A | 1/2002 |

(Continued)

OTHER PUBLICATIONS

U.S. Appl. No. 15/856,976, filed Dec. 28, 2017, Murakami.

*Primary Examiner* — Nhan T Le
(74) *Attorney, Agent, or Firm* — Hauptman Ham, LLP

(57) ABSTRACT

According to one embodiment, an electronic apparatus capable of communicating with a second electronic apparatus of a first user, the electronic apparatus, the electronic apparatus includes a receiver, electronic circuitry, a speaker and a transmitter. The electronic circuitry configured to determine whether the sound of the second user is output by the electronic apparatus or the second electronic apparatus, using at least one of an image of around the first user and sound of around the first user. The speaker configured to output the sound of the second user, is output by the electronic apparatus. The transmitter configured to transmit the signal of the sound of the second user to the second electronic apparatus, is output by the second electronic apparatus.

6 Claims, 16 Drawing Sheets

(51) Int. Cl.
*H04B 1/3827* (2015.01)
*H04W 4/06* (2009.01)

(52) U.S. Cl.
CPC ...... *H04L 12/2805* (2013.01); *H04L 12/2818* (2013.01); *H04W 4/06* (2013.01)

(56) References Cited

U.S. PATENT DOCUMENTS

| | | |
|---|---|---|
| 8,787,543 B2 | 7/2014 | Peregrin Emparanza et al. |
| 9,152,787 B2 | 10/2015 | Gathala et al. |
| 9,189,624 B2 | 11/2015 | Gathala et al. |
| 9,202,047 B2 | 12/2015 | Gupta et al. |
| 9,292,685 B2 | 3/2016 | Gupta et al. |
| 9,298,494 B2 | 3/2016 | Gathala et al. |
| 9,319,897 B2 | 4/2016 | Gupta et al. |
| 9,324,034 B2 | 4/2016 | Gupta et al. |
| 9,330,257 B2 | 5/2016 | Valencia et al. |
| 9,349,001 B2 | 5/2016 | Gathala et al. |
| 9,491,187 B2 | 11/2016 | Sridhara et al. |
| 9,495,537 B2 | 11/2016 | Gupta et al. |
| 2005/0170818 A1 | 8/2005 | Netanel et al. |
| 2012/0033795 A1 | 2/2012 | Peregrin Emparanza et al. |
| 2013/0303154 A1 | 11/2013 | Gupta et al. |
| 2013/0303159 A1 | 11/2013 | Gathala et al. |
| 2013/0304676 A1 | 11/2013 | Gupta et al. |
| 2013/0304677 A1 | 11/2013 | Gupta et al. |
| 2013/0304869 A1 | 11/2013 | Gupta et al. |
| 2013/0305101 A1 | 11/2013 | Gupta et al. |
| 2013/0305358 A1 | 11/2013 | Gathala et al. |
| 2013/0305359 A1 | 11/2013 | Gathala et al. |
| 2014/0006513 A1 | 1/2014 | Takaoka |
| 2014/0038560 A1* | 2/2014 | Lee ..................... H04W 4/16 455/411 |
| 2014/0051432 A1 | 2/2014 | Gupta et al. |
| 2014/0053260 A1 | 2/2014 | Gupta et al. |
| 2014/0053261 A1 | 2/2014 | Gupta et al. |
| 2014/0112506 A1* | 4/2014 | Hopkins ............ H04N 21/4223 381/306 |
| 2014/0150100 A1 | 5/2014 | Gupta et al. |
| 2014/0187177 A1 | 7/2014 | Sridhara et al. |
| 2014/0188781 A1 | 7/2014 | Fawaz et al. |
| 2014/0205099 A1 | 7/2014 | Christodorescu et al. |
| 2014/0237595 A1 | 8/2014 | Sridhara et al. |
| 2014/0245306 A1 | 8/2014 | Gathala et al. |
| 2014/0267542 A1 | 9/2014 | Nakamura |
| 2014/0317734 A1 | 10/2014 | Valencia et al. |
| 2014/0337862 A1 | 11/2014 | Valencia et al. |
| 2015/0148109 A1 | 5/2015 | Gupta et al. |
| 2015/0356462 A1 | 12/2015 | Fawaz et al. |
| 2016/0088009 A1 | 3/2016 | Gupta et al. |
| 2017/0231020 A1 | 8/2017 | Tomici et al. |
| 2018/0096696 A1* | 4/2018 | Mixter ................... G10L 15/08 |
| 2018/0196632 A1* | 7/2018 | Lee ....................... H04R 25/55 |

FOREIGN PATENT DOCUMENTS

| | | |
|---|---|---|
| JP | 2002-527952 A | 8/2002 |
| JP | 2011-23779 A | 2/2011 |
| JP | 2011-118822 A | 6/2011 |
| JP | 2012-247841 A | 12/2012 |
| JP | 2013-110472 A | 6/2013 |
| JP | 2014-42323 A | 3/2014 |
| JP | 2016-9976 A | 1/2016 |
| JP | 2016-512631 A | 4/2016 |
| JP | 2017-506465 A | 3/2017 |
| WO | WO 2015/125451 A1 | 8/2015 |

\* cited by examiner

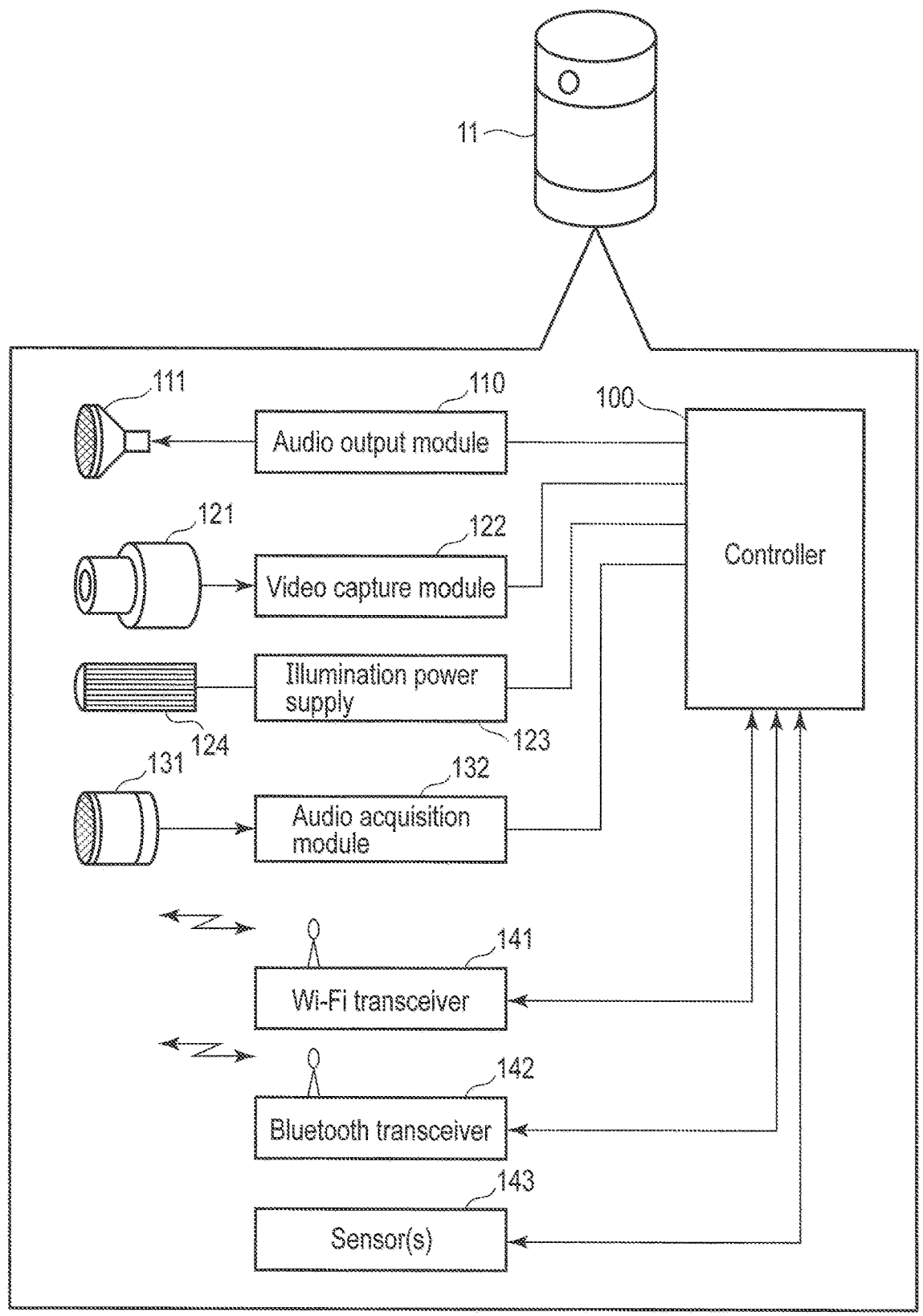
F I G. 2

| No. | Registrant ID | Nominal designation | Telephone number for portable terminal | Bluetooth ID for portable terminal | MAC address for portable terminal | Face image data | Nonportable communication device (nonportable communication device in specific room) to be called even when intended person does not bring portable terminal with him/her |
|---|---|---|---|---|---|---|---|
| 1 | Father | Father | 090-1234-5678 | 23A4FC345232 | 57AC23A69B33 | XXXX…XX | — |
| 2 | Mother | Mother | 090-8765-4321 | 23A4FC345452 | 57AC23A68B31 | XXXX…XX | — |
| 3 | Son | Katsuo | 090-1234-8765 | 23A4FC352B23 | 57AC23A69A73 | XXXX…XX | — |
| 4 | Daughter | Wakame | None | None | None | XXXX…XX | IoT 765003 |
| 5 | Grandfather | Grampa | 090-4321-8765 | 23A4FC3558D1 | 57AC23CD9B88 | XXXX…XX | — |
| ⋮ | ⋮ | ⋮ | ⋮ | ⋮ | ⋮ | ⋮ | ⋮ |

FIG. 12

| No. | Registrant ID | Level of face recognition (None/ID of nonportable communication device which detects face image) | Level of near-field communication (None/ID of detected nonportable communication device) | Level of Wi-Fi recognition (None/Detected IP address) | Acceleration sensor information (Whether person brings portable terminal with him/her) |
|---|---|---|---|---|---|
| 1 | Father | None | None | None | — |
| 2 | Mother | IoT 765001 | None | None | — |
| 3 | Son | IoT 765002 | None | None | — |
| 4 | Daughter | None | IoT 765003 | IP address: A0337C57 | Person does not bring portable terminal with him/her |
| 5 | Grandfather | None | None | IP address: A0337F23 | Person brings portable terminal with him/her |
| ... | ... | ... | ... | ... | ... |

FIG. 13

| No. | Face recognition | Recognition in near-field communication | Recognition in Wi-Fi | Acceleration sensor information of portable terminal | Situation | Destination for communication connection |
|---|---|---|---|---|---|---|
| 1 | Recognized | – | – | – | | Nonportable communication device of room in which face is recognized |
| 2 | Not recognized | Recognized | – | Person brings portable terminal with him/her | Present in room in house | Nonportable communication device of room recognized in near-field communication |
| 3 | | Recognized (nonportable communication device in specific room) | – | Person does not bring portable terminal with him/her | | |
| 4 | | Recognized | – | | Location unclear | None |
| 5 | | Not recognized | Recognized | Person brings portable terminal with him/her | Present in place where no nonportable communication device is provided in vicinity, such as yard | Recognized portable terminal (communication connecting to IP address (via Wi-Fi) |
| 6 | | | | Person does not bring portable terminal with him/her | Location unclear | None |
| 7 | | | Not recognized | – | Away from home | Portable terminal (via Telephone connection line or Public telecommunication network) |

F I G. 14

| No. | Device which receives incoming call | Target mobile terminal and/or nonportable communication device present in vicinity? | Situation of destination of incoming call | Device for communication connection |
|---|---|---|---|---|
| 1 | Mobile terminal (via public telecommunication network) [1] | No nonportable communication device detected near mobile terminal [10] | — | Not switch communication connection (stay incoming call in portable terminal) |
| 2 | | Nonportable communication device detected near mobile terminal [11] | One person preset in room of nonportable communication device near portable terminal [11A] | Communication connection incoming call to detected nonportable communication device via Bluetooth |
| 3 | | | People present in room of nonportable communication device near portable terminal [11B] | Not switch communication connection (stay incoming call in portable terminal) |
| 4 | | | Not determined (camera module of nonportable communication device not operated) [11C] | |
| 5 | Nonportable communication device (via LAN) [2] | Portable terminal of intended person not detected near nonportable communication device [20] | — | Not switch communication connection (maintain reception in or communication connection to nonportable communication device) |
| 6 | | Portable terminal of intended person detected near nonportable communication device [21] | One person present in room of nonportable communication device [21A] | |
| 7 | | | People present in room of nonportable communication device [21B] | Communication connection incoming call to detected portable terminal via Bluetooth |
| 8 | | | Not determined (camera module of nonportable communication device not operated) [21C] | Not switch communication connection (Maintain reception in or communication connection to nonportable communication device) |

FIG. 15

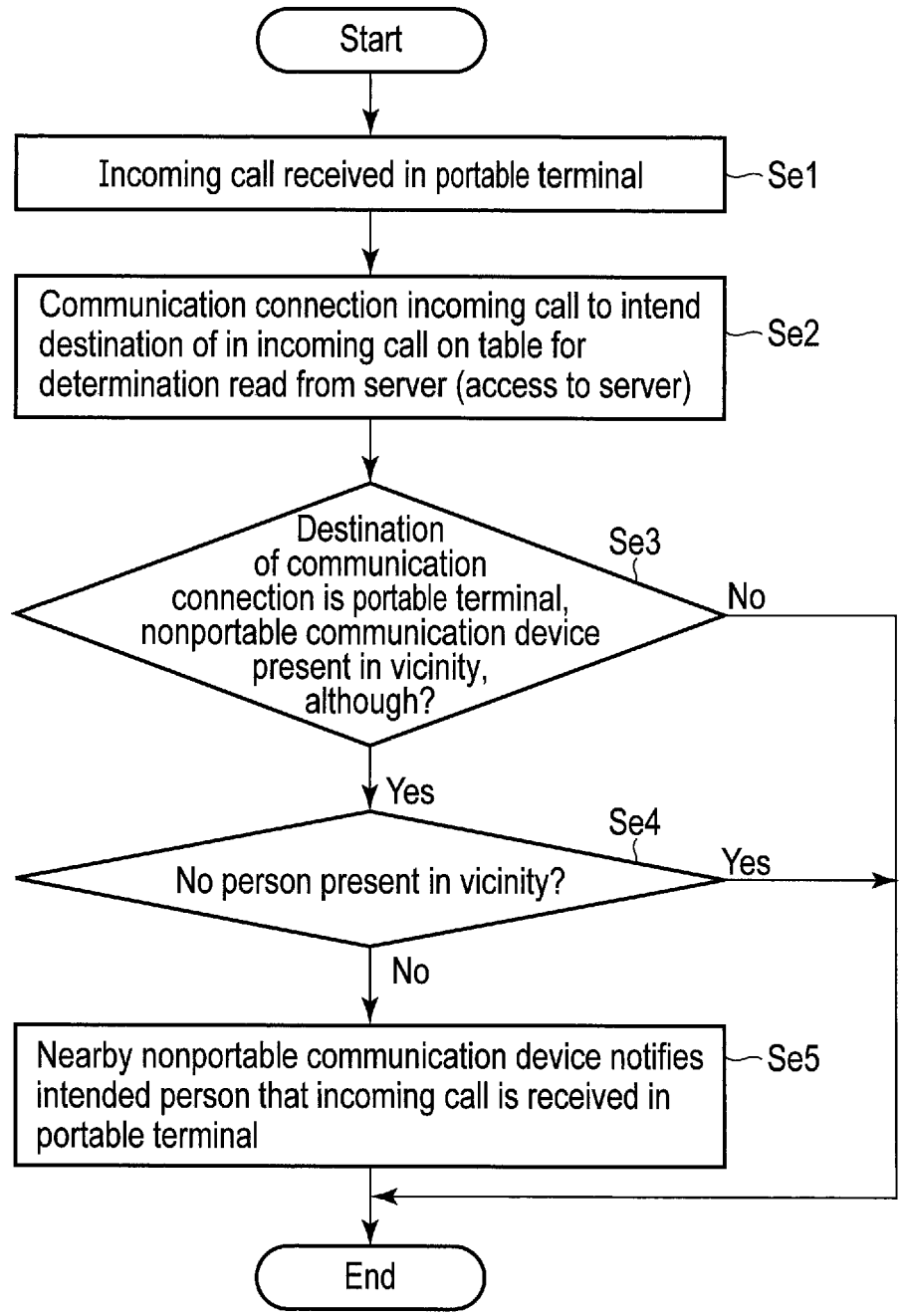
F I G. 16

ELECTRONIC APPARATUS AND METHOD

CROSS-REFERENCE TO RELATED APPLICATIONS

This application is based upon and claims the benefit of priority from Japanese Patent Application No. 2017-101880, filed May 23, 2017, the entire contents of which are incorporated herein by reference.

FIELD

Embodiments described herein relate generally to an electronic apparatus and a method.

BACKGROUND portable electronic apparatuses, such as smartphones, portable phones, tablet computers and wearable devices, have become widespread. Recently, nonportable communication devices capable of communicating with portable electronic apparatuses in the following manner have become widely used. The nonportable communication devices relay communication with a portable electronic apparatus by sound acquisition with a microphone and sound output from a speaker while the portable electronic apparatus is placed at an arbitrary position. Nonportable communication devices may be called handsfree communication devices (Internet-on-Things [IoT] devices).

When a call (sound communication) received in a mobile phone is reproduced by the speaker of a handsfree communication device (nonportable communication device), and further when a person other than the owner of the portable phone is present around the owner, the calling party or owner needs to care about the conversational content. The calling party may need to ask the intended person (owner) to move to a place to leave him/her alone depending on the conversational content. Thus, nonportable communication devices are required to specify whether or not other people are present around the intended person.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 shows an example of the configuration of a communication device as a representative example.

FIG. 12 shows the registration information table of the registrants, communication devices and portable terminals registered in the communication system.

FIG. 13 shows a situation table used to know the current positions of the registrants, communication devices, portable terminals, etc., registered in the communication system.

FIG. 14 shows a communication connection destination (move destination) determination table which is used when a communication route is established.

FIG. 15 shows a call/communication connection destination determination table which is used when a communication route is established.

FIG. 16 is a flowchart for determining the transmission route (call/communication connection destination) of communication based on the situation of the location of the intended person when the communication system of the present embodiment specifies the location of the intended person and forms a communication route.

DETAILED DESCRIPTION

In general, according to one embodiment, electronic apparatus capable of communicating with a second electronic apparatus of a first user, the electronic apparatus, the electronic apparatus comprises: a receiver, electronic circuitry, a speaker and a transmitter. The receiver configured to receive a request of a call with the first user from a second user and to receive a signal of sound of the second user during the call between the first user and the second user. The electronic circuitry configured to determine whether the sound of the second user is output by the electronic apparatus or the second electronic apparatus, using at least one of an image of around the first user and sound of around the first user. The speaker configured to output the sound of the second user, if it is determined that the sound of the second user is output by the electronic apparatus. The transmitter configured to transmit the signal of the sound of the second user to the second electronic apparatus, if it is determined that the sound of the second user is output by the second electronic apparatus.

Various embodiments will be described hereinafter with reference to the accompanying drawings.

<General Outline of Environment Including a Plurality of Communication Routes to be Selected>

Figure 1:
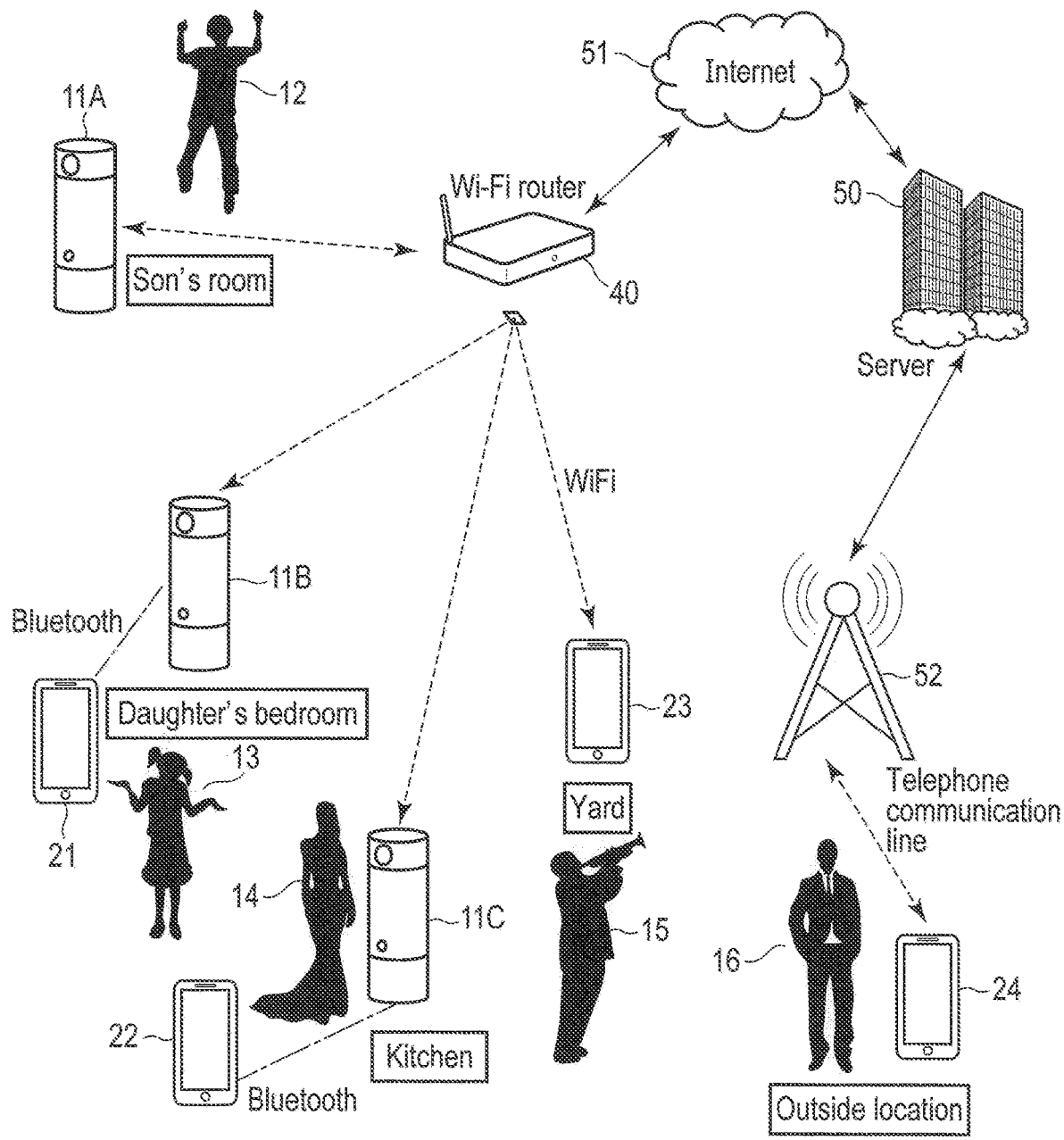
FIG. 1 is an explanatory diagram showing an example of a communication system for a family to which one embodiment is applied.

FIG. 1 shows an example of a communication system for a family (environment including a plurality of communication routes to be selected within an area [house]) to which one embodiment is applied.

In the area (house) shown in FIG. 1, the family includes, for example, a son (child [boy]) 12, a daughter (child [girl]) 13, a mother 14, a grandfather 15 and a father 16. The house of the family provides at least the room of the son, the room of the daughter, a kitchen, the room (master bedroom) of the mother and father (not shown), a living room (not shown) and a yard. The members of the family bring their respective portable electronic apparatuses associated with each other in one-to-one relationship, such as smartphones, portable phones, tablet computers or wearable devices. As a matter of course, for example, it is possible to put each portable phone in a bag or a pocket of clothes and use various supplementary devices such as a wristband or watch, a headset in which a headphone and a microphone are integrally prepared, or a pen integrally comprising a microphone and a compact speaker.

It is assumed that a nonportable communication device 11A is provided in the room of the son 12. A communication device 11B is provided in the room of the daughter. A communication device 11C is provided in the kitchen.

Each communication device 11 (A, B or C; the alphabetical letters may be omitted unless necessary) may be referred to as an electronic apparatus for talking, a thing (Internet-on-Things [IoT] device or a multifunctional device) or an electronic apparatus for monitoring. The configuration of each communication device 11 is explained in detail later with reference to FIG. 2. Each communication device 11 comprises, for example, in the space where the communication device 11 is provided, an audio acquisition unit (microphone) which obtains surrounding sound for realizing speech communication (conversation) with someone present in the space, and an audio reproduction unit (speaker). The audio acquisition unit (microphone) is configured to obtain surrounding sound in addition to the speech for conversation.

Each communication device 11 further comprises a video acquisition module (camera module). The camera module may be provided either integrally with the communication device 11 or independently. When the camera module is prepared independently, the communication device 11 may obtain a video signal (capture data) from a camera module already provided at an arbitrary position.

Each communication device 11 may be prepared by combining some of a near-field communication function, a communication function within an area (local area network), a speech recognition function, a video recognition function and various sensors (detection functions). The communication function within an area is preferably, for example, a wireless communication function (Wi-Fi). With regard to the speaker and microphone, the communication device 11 may provide the function of the microphone by using the speaker already provided as an audio output unit.

In the following description, it is assumed that electronic device 24 owned by the father 16 is located outside the area since the father 16 is away from home with electronic device 24. Electronic device 22 owned by the mother 15 is located in the kitchen since the mother brings it with her. The son 12 does not own such an electronic device. Electronic device 21 owned by the daughter 13 is located in the room of the daughter since the daughter leaves it in the room. The grandfather 15 leaves his electronic device 23 in the room (of the grandfather) or the living room. The grandmother (not shown as she is outside the area) holds her electronic device in a different area that she lives in. Communication with the area that the grandmother lives in can be realized via a public telecommunication network.

The position of each portable electronic apparatus, the position of the person who owns the portable electronic apparatus and whether the person brings the portable electronic apparatus with him/her are successively changed as an example in which the communication route to be selected is changed.

Each communication device 11 uses the portable electronic apparatus (here, portable terminal 21, 22, 23 or 24) owned by someone (person) present in the space and a communication device 11 usable by the person and realizes information communication (conversation) with the portable electronic apparatus owned by the intended person in a handsfree state by audio acquisition with the microphone of the communication device 11 and audio output with the speaker.

In the following explanation, a handsfree device is defined as follows.

A handsfree device is a device supposed to be used while it is placed on a table, a shelf, etc., when the user makes a call using the device. A handsfree device is a portable electronic apparatus such as a speaker, a conference system, a vehicle navigation system (moving object navigation system), a projector, etc. In some cases, a handsfree device has to be held by the user for conversation when the output sound volume is low. Even when a supplementary device is additionally used as described above, the term "handsfree device" is applicable in the call/communication connection destination determination explained later with reference to FIG. 15, FIG. 16 and FIG. 17.

A non-handsfree device is defined as follows.

A non-handsfree device is a device supposed to be held by the user with his/her hand in a state where the speaker or microphone is close to the ear or mouth when the user makes a call using the device. For example, a non-handsfree device is a nonportable electronic apparatus such as a smartphone or a portable phone. In some cases, a non-handsfree device may be used while it is placed on a desk, etc., when the output sound volume is high.

Each communication devices 11A, 11B and 11C is capable of performing near-field communication with a router 40. This communication is, for example, communication in accordance with Wi-Fi (registered trademark). The router 40 is capable of communicating with portable terminals in accordance with Wi-Fi. The router 40 is also capable of communicating with a server 50 via the Internet 51.

Each of communication devices 11A, 11B and 11C is capable of communicating with a portable terminal at a short distance (or a nearby portable terminal). This communication is, for example, communication in accordance with Bluetooth (registered trademark).

In the example of FIG. 1, the router 40 is capable of communicating with communication devices 11A, 11B and 11C and portable terminal 23 in accordance with Wi-Fi. Communication devices 11B and 11C are capable of communicating with portable terminals 21 and 22, respectively, via the router 40.

The son 12, the daughter 13 and the mother 14 can call portable terminal 24 of the father 16 by means of the respective communication devices 11A, 11B and 11C or their portable terminals. At this time, the communication route is established (formed) by the router 40, the Internet 51, the server 50, an access point 52 and portable terminal 24 of the father. The father 16 can connect the communication route of his portable terminal 24 to communication devices 11A, 11B and 11C of each of the son 12, the daughter 13 and the mother 14.

FIG. 2 shows an example of the configuration of each communication device 11 (A, B or C; the alphabetical letters are added when needed).

Each communication device 11 comprises a controller 100. The controller 100 is capable of outputting audio data. An audio output module 110 applies digital-analog (D-A) conversion to the audio data such that the volume, etc., is controlled. The audio data is supplied to a speaker 111.

The video signal obtained by a camera module 121 is subjected to digitalization and encoding in a video capture module 122, and is input to the controller 100. The controller 100 is capable of controlling an illumination power supply 123 to control an illumination device 124. The controller 100 is also capable of obtaining the surrounding sound by a microphone 131 and an audio acquisition module 132. The illumination device 124 is used to illuminate the area to be captured by the camera module 121 when the circumference is dark.

The controller 100 communicates with a nearby portable terminal or communication device via a transceiver 141, using a Wi-Fi function (a communication function within an area [a wireless LAN function]). The controller 100 is capable of communicating with a nearby portable terminal via a transceiver 142 in accordance with near-field communication such as Bluetooth.

Further, the detection signals from various sensors 143 may be input to the controller 100. The controller 100 may control the operation of the sensors 143 (for example, power-on, power-off or changeover of characteristics). The camera module, microphone and speaker may be turned off or on by the user's operation. In each device 11, at least one of the camera module, speaker and microphone may use the data obtained from the elements already provided. Each communication device 11 may be, for example, a computer equipped with a camera module. As the near-field communication function, for example, zigbee (registered trademark) or Z-Wave (registered trademark) may be used.

Figure 3:
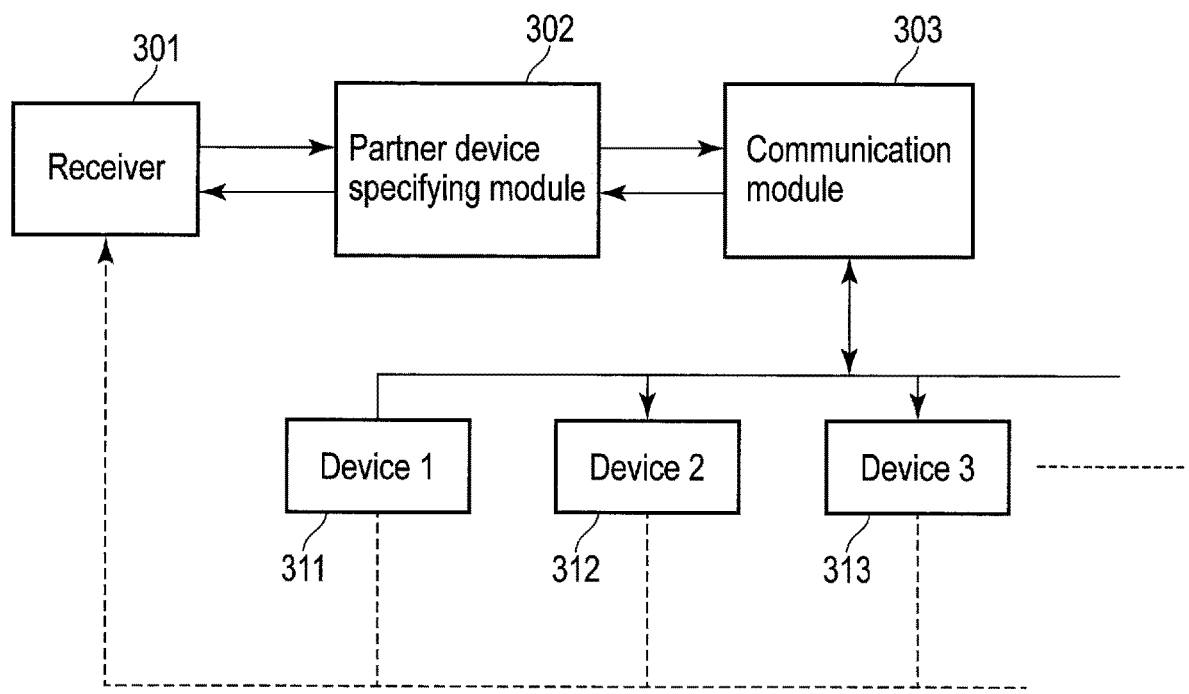
FIG. 3 shows an extracted part of the configuration of a communication system.

FIG. 3 shows an extracted part of the configuration of the communication system. A receiver 301 receives a call signal input from outside and requests communication with a first user. The first user is, for example, a user brings a device 311 or present near device 311.

A specifying module 302 is capable of specifying the first device 311 present near the first user or owned by the first user from a plurality of devices based on the call signal received by the receiver 301. A communication module 303 establishes a communication route based on the result specified by the specifying module 302 such that the first device 311 is allowed to perform communication based on the request.

The configuration shown in FIG. 3 may be constructed in a single communication device, or may be constructed in the server 50 and realized in cooperation with each device. Alternatively, the configuration may be separately realized by the devices shown in FIG. 1. As described above, the output (data) from the elements already provided, such as the speaker and camera module, may be used.

Figure 4:
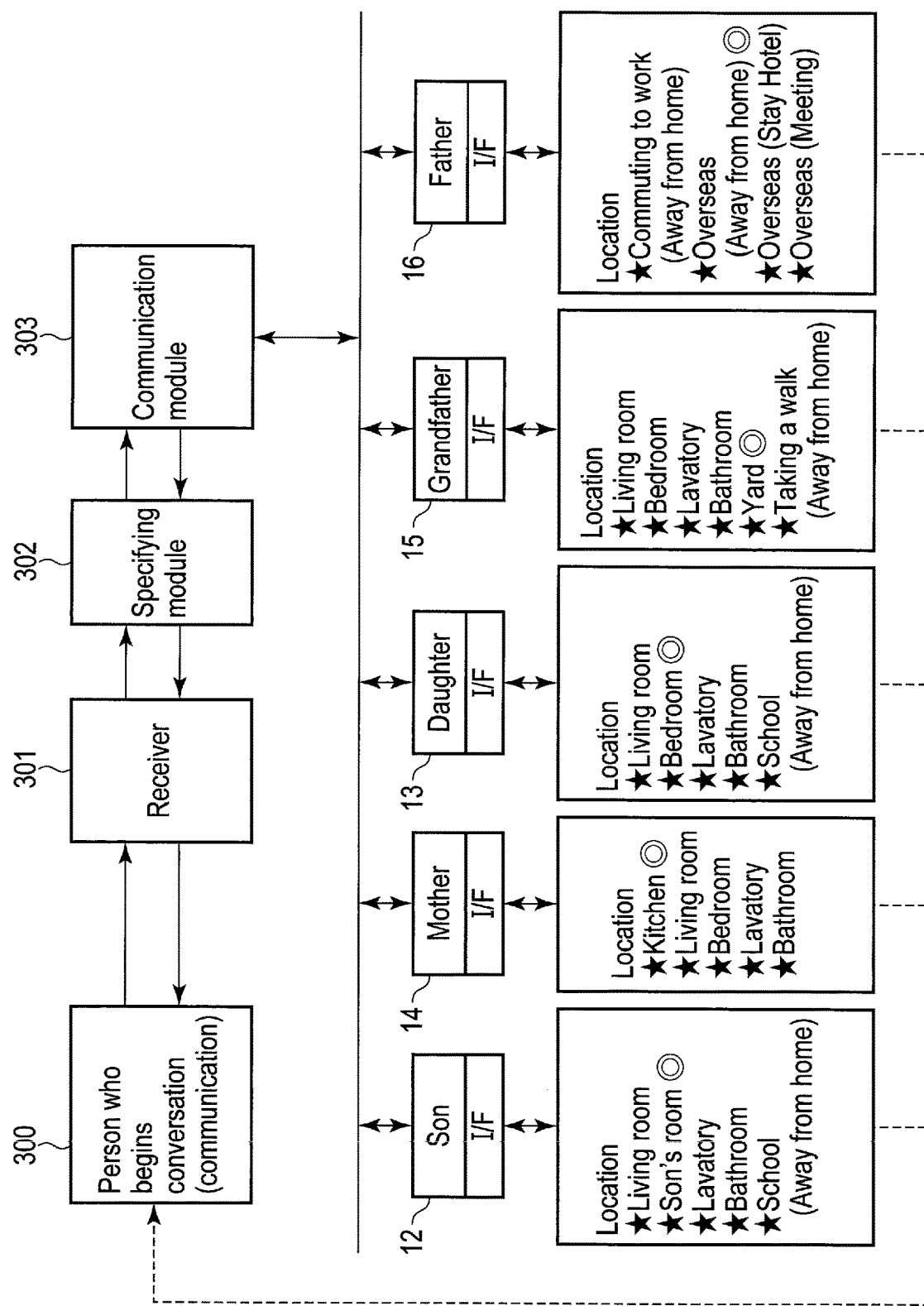
FIG. 4 exemplarily shows that the configuration shown in FIG. 3 is applied to the family shown in FIG. 1.

FIG. 4 exemplarily shows that the above configuration is applied to the family shown in FIG. 1. In the following description, this specification explains various examples in which a communication route is established between an utterer (one of the son 12, the Daughter 13, the mother 14, the grandfather 15 and the father 16) who begins conversation (communication) and the intended person (one of the son 12, the sister 13, the mother 14, the grandfather 15 and the gather 16) for the utterer. The communication route is realized via the receiver 301, the specifying module 302 and the communication module 303.

Example 1

In this system, when the person who begins conversation (the utterer) says the name (for example, "mom" or "dad") of the intended person to the communication device located near the utterer, voice (calling voice) or ringtone is automatically output to the communication device present near the intended person. The method (user interface [UI]) for identifying (specifying) the intended person may be, for example, a graphical user interface (GUI) displayed on the screen of the terminal held by the utterer, a button displayed on the screen or a button (hardware button) widely used in a remote controller in addition to a voice instruction and the authentication of the result of video recognition. For example, when a voice instruction is used, a dictionary for various ways of calling is prepared such that the same person can be specified for various ways of calling such as the name of the person, calls ("big brother" and "nanny") which can specify the individual based on information on age like brother and sister and grandfather and grandmother (father and mother), and nicknames. Further, when a voice instruction is used, the person having an age feature for the utterer can be specified by identifying the utterer by speech recognition. For example, when the daughter 13 says "Dad", the father 16 is specified. When the father 16 says "Dad", the grandfather 15 is specified.

For example, when the son 12 shown in FIG. 1 says "I want to speak to mom" in the room of the son, a communication route is formed between communication device 11C of the kitchen in which the mother 14 is present and communication device 11A of the child's room. The sound "I want to speak to mom" is output from communication device 11C. Communication device 11A is not connected to the communication devices of the other bedrooms or the communication device of the living room.

Example 2

In this case, whether the intended person (for example, the mother) is present near communication device 110 is determined by the human recognition (face recognition) function of the camera module attached to communication device 11C or the camera module provided in the room or kitchen in which the mother is present in cooperation with communication device 11C.

Example 3

For example, when the son 12 says "I want to speak to dad" in the child's room, the father may not be detected by the Wi-Fi of the communication devices or portable terminals in the house based on the router 40 (in other words, it is determined that the father is not present in the house). In this case, the communication route is automatically connected to portable terminal 24 of the father. As shown in FIG. 1, when it is determined that the father 16 is not present in the house, a communication route is established via the router 40, the Internet 51, the server 50, the access point 52 and portable terminal 24. Thus, even when the father 16 is outside the country on a business trip, a communication route is established with the portable terminal of the father 16 via the Internet 51. It should be noted that, when the father 16 is outside the country on a business trip, for example, the message or sound "Dad is working abroad" may be output to prevent unintended establishment of a communication route via the Internet 51.

As another example, it is assumed that the mother 14 says "Grampa" to communication device 11C. In the example of FIG. 1, the grandfather 15 is present in the yard, and portable terminal 23 of the grandfather 15 is detected by the router 40. In this case, a communication route is formed via communication device 11C, the router 40 and portable terminal 23. Thus, a call is made to portable terminal 23.

Example 4

Whether the intended person is present near the communication devices provided in the house may be determined by the communication devices when near-field communication is performed between the portable terminal (device) held by the intended person and the communication devices. When the device of a room detects the smartphone of the intended person in accordance with near-field communication, the communication route is established for the device of the room.

When a communication device detects the portable terminal of the intended person in accordance with near-field communication, the communication device on the utterer side is connected to the communication device which detects the portable terminal of the intended person. For example, as shown in FIG. 1, in the room of the daughter 13, communication device 11B of the room of the daughter 13 detects nearby portable terminal 21 of the daughter. In this case, for example, when the mother 14 says "Wakame" (the daughter's name) to communication device 11C, a communication route is formed between communication device 11C and communication device 11B.

Whether the intended person is present near a communication device and brings the portable terminal with him/her is determined based on, for example, the output of the acceleration sensor information of the portable terminal. In the example of FIG. 1, when the daughter 13 touches portable terminal 21 and enjoys a game, communication device 11B detects that portable terminal 21 is present near communication device 11B in accordance with Bluetooth communication.

The method for detecting the presence of the intended person or a specific person in the vicinity (or the presence or absence of a visitor) is not limited to the detection of the portable terminal held by the partner (user) by each communication device 11, and may be any method as long as a person can be detected. For example, a person may be recognized by a camera module. Sound may be obtained by a microphone (including the use of a speaker as a microphone when the speaker is not used), and an individual may be specified based on the feature amount of the obtained sound. The presence of a person may be detected by a motion (thermal) sensor, and an individual may be specified by audio or video data. It should be noted that, for example, pets are preferably registered as the exclusion from the detection target in advance.

Example 5

When a communication device is associated with a nearby portable terminal like example 4, and further when it is determined that the portable terminal is not held by the owner, the device on the utterer side is not connected to the portable terminal (when it is determined that the portable terminal is not held by the owner, the device on the utterer side is not connected to the communication device 11 provided in the room).

In the example of FIG. 1, when the mother 14 says "Katsuo" (the name of the son 12) to communication device 11C, a communication route is merely formed between communication device 11C and communication device 11A since the son 12 does not bring a portable terminal.

Example 6

Even when it is determined that a portable terminal is not held as with example 5, if the portable terminal or the room is registered in particular, the communication device on the utterer side is connected to the portable terminal.

For example, since a portable terminal is placed on a bedside table in a bedroom, the portable terminal may be registered as a limited (special) device (it is determined that the person is present in the room even when the person does not bring the portable terminal with him/her). In this way, a connection route can be formed between the portable terminal in the bedroom and the communication device of the calling party. For example, in many cases, a person who cannot freely or easily move around the room (a sick person or a person in need of nursing care) places his/her portable terminal on a bedside table for a long time. Thus, the portable terminal is preferably registered as a limited (special) device. As the conditions for registration, the time periods in which the person is not present in the room presumably, such as the time for a meal or in a bath, are preferably excluded.

Example 7

For example, when the communication connection destination is unclear (when the communication connection destination communicable with the calling party is not found) in example 1, the user is notified of the fact from the communication device (for example, by sound).

For example, when the son 12 says "I want to speak to Mr. Yamada" in FIG. 1, and the information of Mr. Yamada is not registered in the system, communication device 11A outputs a speech (an acoustic) output of "Mr. Yamada is not registered".

Example 8

In the above examples, this specification mainly explains a communication route connected from a communication device to a portable terminal. However, a portable terminal may directly receive a call from outside (calling request [incoming call]). In this case, a communication route may be constructed in the following manner. The portable terminal may be connected to a nearby communication device. Subsequently, the communication device may be connected to another communication device present near the owner of the portable terminal.

It is assumed that, in FIG. 1, for example, the daughter 13 moves to the kitchen and helps the mother 14 cook. When portable terminal 21 placed in the bedroom of the daughter 21 (in other words, the portable terminal of the daughter) receives a call from outside, a communication route is formed from portable terminal 21 to communication device 11B, the router 40 and communication device 11C since the electronic system knows the location of the daughter 13. As another example, when a portable terminal placed in a bedroom while recharging receives a call, the owner of the portable terminal may be present in the living room different from the bedroom. In this case, the call to the portable terminal placed in the bedroom is automatically connected to the communication device of the living room in which the owner is present via the communication device provided in the bedroom automatically connected in accordance with near-field communication. In this way, the owner can have a conversation with the calling party by the communication device of the living room.

When, regardless of whether an individual holds a portable terminal (brings a portable terminal with him/her), for example, a call is received from a family member via a communication line outside the area, and the location of the partner associated with the portable terminal cannot be specified by any communication device, the portable terminal of the partner (communication target) is notified (informed) of the reception of the call via a public telecommunication network. For example, when the calling party is unclear, a message or data indicating that the intended person is unavailable is sent back. The priority for notifying the portable terminal of the intended person that a call is received may be set in advance. For example, calls from family members and friends are preferably reported even at midnight. However, to calls from work-related calling parties, a request to call back in working hours (typical business hours) may be sent back. It is possible to put restrictions on a case where the reception of a call to a portable terminal present in a registered place is reported as with example 6, and a case where it is clear that the call is made from a family member.

<Reference Tables and Data>

Now, this specification explains reference tables and data used to dynamically construct each of the above communication routes.

FIG. 12 shows the registration information table of the registrants, communication devices and portable terminals registered in the above communication system.

FIG. 13 shows a situation table used to know the current positions of the registrants, communication devices and portable terminals registered in the above communication system.

FIG. 14 shows a communication connection destination (move destination) determination table which is used when a communication route is established as described above.

FIG. 15 shows a call/communication connection destination determination table which is used when a communication route is established. The data shown in FIG. 12 to FIG. 15 may be held by the server 50 shown in FIG. 1, or may be held by any of the communication devices shown in FIG. 1.

To accurately operate the above communication system, as shown in FIG. 12 (registration information table), it is necessary to register the people using the system, the communication devices to be used, the portable terminals to be used, etc. A security module, an intercom and special sensors for temperature, humidity, light and sound, incorporated into the communication system, may be added.

In the registration information table shown in FIG. 12, the identification data (ID) of the father, mother, son, daughter and grandfather as family members is registered. The nominal designations of the registrants (father, mother, Katsuo [son], Wakame [daughter] and grampa) are registered. Further, the telephone numbers of the portable terminals of the registrants, the Bluetooth IDs of the portable terminals, the MAC addresses of the portable terminals, face data, and the addresses of communication devices (IoT devices) with which a contact is made even if the owner does not bring a portable terminal with him/her are registered.

In the situation table shown in FIG. 13, the identification data (ID) of the father, mother, son (Katsuo), daughter (Wakame) and grandfather as family members is described. Situation data indicating how each member currently relates to the communication devices and portable terminals is updated and described. The situation data may be regularly updated, or may be updated when a call is made.

The communication connection destination (move destination) determination table shown in FIG. 14 shows the combinations of requirement data necessary to determine the communication route (connection route) with the location of the intended person when an utterer calls the person.

In case 1, the face of the intended person is recognized by a communication device. In case 1, the portable terminal of the intended person is not detected by any communication device in accordance with near-field communication, and the router does not detect the portable terminal of the intended person in accordance with Wi-Fi, and further, the acceleration sensor information of the portable terminal of the intended person is not obtained. In this case, it is determined that the intended person is present in the room in which the communication device which recognizes the face is provided. As a result, a communication route with the communication device which detects the face is established for the called person in case 1.

In case 2 is an example in which the face is not recognized, and the communication device associated with the intended person detects the portable terminal of the intended person in accordance with near-field communication, and further, it is clear that the intended person brings the portable terminal with him/her. In this case, it is determined that the intended person is present in the room in which the communication device is provided. In case 2, a communication route is established such that the device on the utterer side is connected to the communication device provided in the room in the house.

In case 3 is an example in which the face is not recognized, and the communication device provided in the specific room associated with the intended person detects the portable terminal of the intended person in accordance with near-field communication, and further, it is clear that the intended person does not bring the portable terminal with him/her. This example is the environment explained in example 6. In this case, it is determined that the intended person is present in the specific room. In case 3, a communication route is established such that the device on the utterer side is connected to the communication device provided in the limited (specific) room in the house.

In case 4 is an example in which the face is not recognized, and the communication device provided in the specific room associated with the intended person detects the portable terminal of the intended person in accordance with near-field communication, and further, it is clear that the intended person does not bring the portable terminal with him/her. In this case, it is determined that the location of the intended person is unclear. An exception to this case 4 is the above case 3. In case 4, the communication device notifies the user that the communication connection destination communicable with the calling party is not found (by sound, etc.) as explained in example 7.

In case 5 is an example in which the face is not recognized, and the communication device provided in the specific room associated with the intended person does not detect the portable terminal of the intended person in accordance with near-field communication, and the router recognizes that the intended person brings the portable terminal with him/her in accordance with Wi-Fi communication. In this case, it is determined that the intended person is present near the house but in a place where no communication device (IoT device) is provided in the vicinity.

The case 5 is equivalent to a case where the mother 14 says "Grampa" to communication device 11C as explained in example 3. In this case, the device of the utterer is connected to the portable terminal in accordance with Wi-Fi communication.

In case 6 is an example in which the face is not recognized, and the communication device provided in the specific room associated with the intended person does not detect the portable terminal of the intended person in accordance with near-field communication, and the router detects the portable terminal of the intended person in accordance with Wi-Fi communication, and the intended person does not bring the portable terminal with him/her. In case 6, the communication device notifies the user that the communication connection destination communicable with the calling party is not found (by sound, etc.) as explained in example 7.

In case 7 is an example in which the face is not recognized, and the communication device provided in the limited (specific) room associated with the intended person does not detect the portable terminal of the intended person in accordance with near-field communication, and the router does not detect the portable terminal of the intended person in accordance with Wi-Fi communication. In this case, the communication system determines that the intended person is away from home. Telephone connection is performed for the portable terminal of the intended person by the number of the portable terminal.

As explained above, this communication system is capable of determining the communication route based on the situation of the intended person. To realize this configuration, the communication system uses the registration information table shown in FIG. 12, the situation table shown in FIG. 13, the communication connection destination (move destination) determination table shown in FIG. 14 and the call/communication connection destination determination table shown in FIG. 15.

The registration information table shown in FIG. 12 is registered as common data when communication devices are provided in rooms.

For example, a communication device is connected to the portable terminal of a user. As the connection method, for example, the communication device is set to a registration mode. The portable terminal of the user is set to an operation mode in accordance with, for example, Bluetooth. The ID of the communication device is input to the portable terminal. In this way, the communication device can communicate with the portable terminal. The message "Enter registrant ID" is displayed on the screen of the portable terminal. The registrant ID may arbitrary. In this case, the registrant IDs of the family members are preferably different from each other. Subsequent to the registrant IDs, nominal designations such as "Katsuo", "Wakame", "dad", "mom" and "grampa" may be entered.

At this time, the telephone number, Bluetooth ID and MAC address of the portable terminal are automatically transmitted to and registered in the communication device. The message "Do you want to register face image data?" is displayed on the screen of the portable terminal. When the user registers face image data, for example, the user says "yes" or "please", facing the front side of the camera module of the communication device. Thus, the face image of the user is obtained by the communication device. When the user says "no", face image is not obtained.

In a state where the communication device is in registration mode, it is possible to register the communication device (a communication device in a specific room) to be called by forming a communication route even when it is determined that the intended person does not bring the portable terminal with him/her. This registration is performed to establish the communication route explained in case 3. In the menu of registration mode, for example, the message "Do you want to register a communication device in a specific room?" is prepared. The user may select the message, enter the ID of the communication device of a specific room in the portable terminal and select a confirmation button.

In the above communication system, the data of the situation table shown in FIG. 13 is updated when a call is made by an utterer or regularly. However, the data shown in FIG. 13 is preferably updated every time the information of a shaking portable terminal (in other words, shaking which allows determination that a portable terminal is carried) is received.

Figure 5:
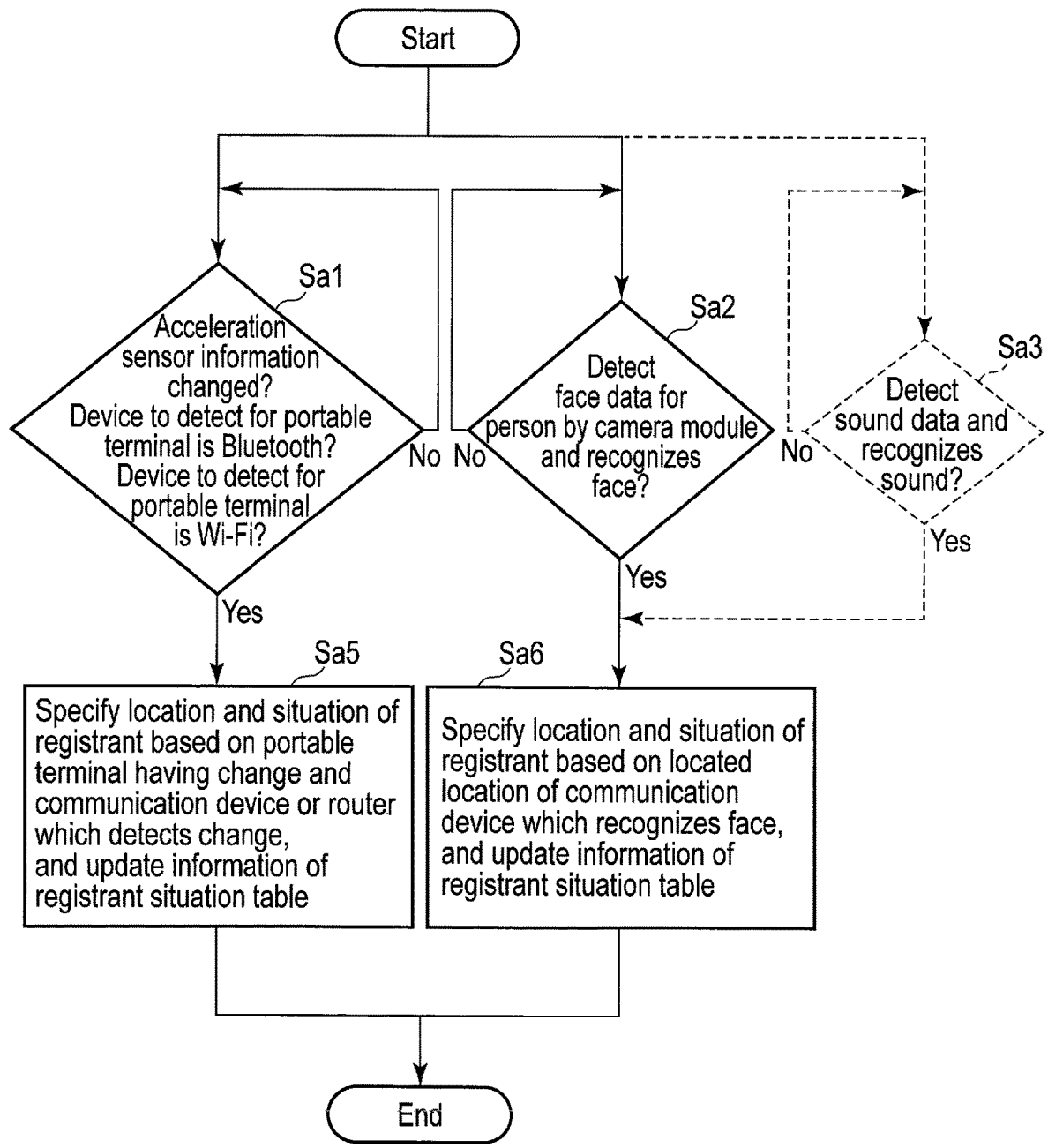
FIG. 5 shows an example of the operation flow when the data of FIG. 13 is updated.

FIG. 5 shows an example of the operation flow when the data shown in FIG. 13 is updated. When the owner of a portable terminal moves with the portable terminal, there is a change in the acceleration sensor information of the portable terminal.

This change is detected in accordance with, for example, Bluetooth communication between the communication device and the portable terminal (to detect for portable terminal is Bluetooth?) or Wi-Fi communication between the router 40 and the portable terminal (to detect for portable terminal is Wi-Fi?). Communication using Bluetooth or Wi-Fi is initiated by a controller provided in the communication device or a controller provided in the router. The obtained information regarding the change in the acceleration sensor information of the portable terminal is used to update the column of the acceleration sensor information in FIG. 13. The acceleration sensor information indicates that the owner brings the portable terminal with him/her or the owner does not bring the portable terminal with him/her. At this time, information indicating that the acceleration sensor information is detected in accordance with Bluetooth, Wi-Fi or both of them is also updated in FIG. 13 (Sa1).

The above communication process clarifies whether there is a change in the acceleration sensor information and the ID of the communication device which communicates with the portable terminal or the IP address of the router which communicates with the portable terminal. Thus, the room in which the portable terminal is present or the absence of the portable terminal in any room is confirmed. In this way, the location or situation of each registrant can be updated (Sa5).

The faces of users who register face image data in FIG. 12 can be recognized by the communication device of each room in which the camera module is turned on. Each communication device is capable of obtaining face image data when a moving object is detected by the camera module (detect face data for person by camera module and recognizes face?). The communication system is configured to compare the obtained face image data with the face image data registered in FIG. 12 and recognize the person and room of the obtained face image data (Sa2).

When the obtained face image data matches the registered face image data of a registrant, the presence of the registrant in the room of the communication device from which the data is obtained is confirmed. In accordance with the result of confirmation, the located location and situation of the registrant can be updated (Sa6).

Further, as each communication device comprises the microphone, a speech recognition function may be used. For example, the voice data of the registrants is registered in FIG. 12 in a manner similar to that of face image data (specify location and situation of registrant based on located location of communication device which recognizes face, and update information of registrant situation table). When a communication device picks up the voice of a user, the communication device recognizes the voice of the user and confirms that the user is present in the room.

Figure 6:
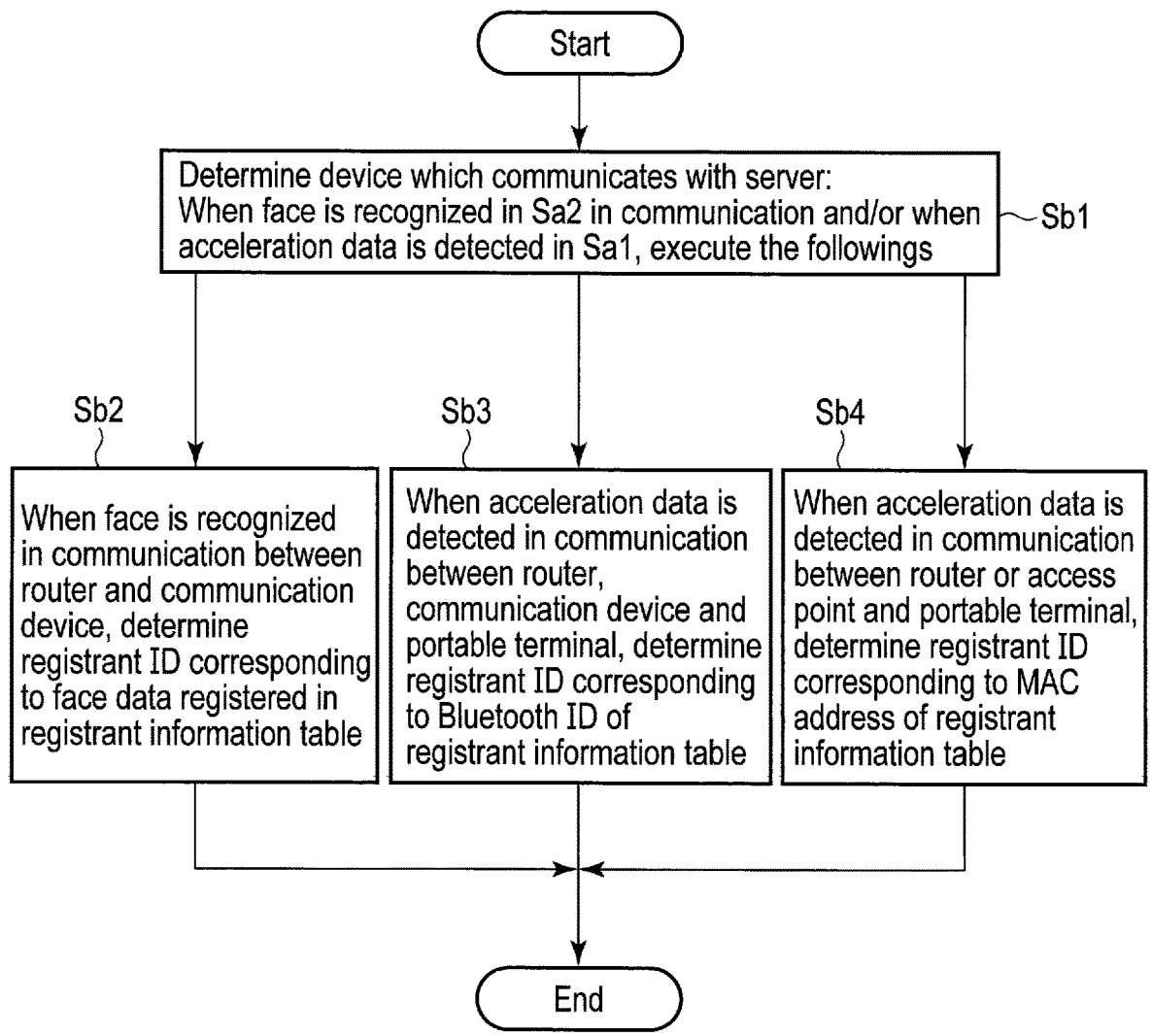
FIG. 6 is a flowchart for explaining a method in which the server of FIG. 1 specifies, based on with which device the server communicates, the registrant ID of the device, on the assumption that the server is capable of recognizing the data of FIG. 12, FIG. 13 and FIG. 14.

FIG. 6 shows a method in which the server 50 of FIG. 1 specifies, based on with which device the server 40 communicates (determine device which communicates with server, when face is recognized in Sa2 in communication and/or when acceleration data is detected in Sa1), the registrant ID of the device, on the assumption that the server 50 is capable of recognizing the data of FIG. 12, FIG. 13 and FIG. 14 (Sb1).

In block Sb2 shown in FIG. 6, the server 50 may obtain face image data based on the communication via the router 40 and one of the communication devices. In this case, registered face image data corresponding to the obtained face image data is detected. A resistant ID corresponding to the detected registered face image data is determined with reference to the registration information shown in FIG. 12 (face is recognized in communication between router and communication device, determine registrant ID corresponding to face data registered in registrant information table).

In block Sb3 shown in FIG. 6, the server 50 may detect acceleration sensor information indicating the movement of a portable terminal based on the communication via the router 40, one of the communication devices and one of the portable terminals. In this case, the Bluetooth ID used for the communication between the portable terminal and the communication device is specified with reference to FIG. 12 (acceleration data is detected in communication between router, communication device and portable terminal, determine registrant ID corresponding to Bluetooth ID of registrant information table). A registrant ID corresponding to the Bluetooth ID is determined with reference to FIG. 12.

In block Sb4 shown in FIG. 6, the server 50 may communicate with a portable terminal via the router 40 or the access point 52 and detect the acceleration sensor information of the portable terminal. In this case, when the communication is performed via the router 40, a registrant ID corresponding to the Bluetooth ID of the portable terminal is determined with reference to FIG. 12. When the communication is performed via the access point 52, a registrant ID corresponding to the telephone number of the portable terminal is determined with reference to FIG. 12 (acceleration data is detected in communication between router or access point and portable terminal, determine registrant ID corresponding to MAC address of registrant information table).

Figure 7:
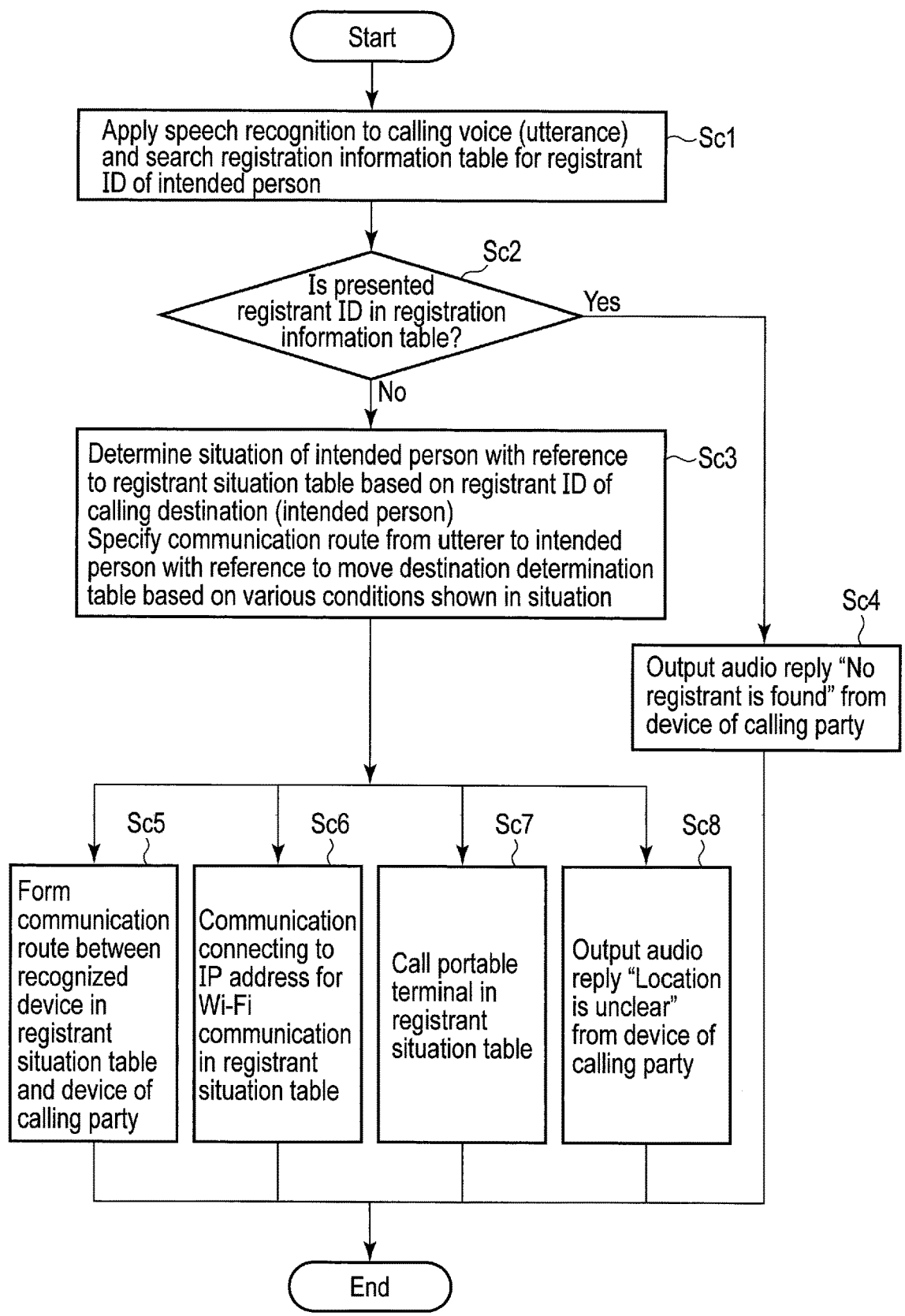
FIG. 7 is a flowchart showing an example in which the communication system of the present embodiment specifies the location of the intended person and forms a communication route.

FIG. 7 shows an example in which the communication system of the present embodiment specifies the location of the intended person and forms a communication route. It is assumed that a user speaks to the communication device of a room (speech recognition to calling voice (utterance) and search registration information table for registrant ID of intended person). In other words, it is assumed that a communication device collects calling voice (utterance). Subsequently, the communication system applies speech recognition to the calling voice (for example, "I want to speak to mom"), and searches for the registrant ID (the ID of the mother) of the intended person registered in the registration information shown in FIG. 12 (Sc1). When the registrant ID is not found in FIG. 12 (is not found presented registrant ID in registration information table?), the communication device of the calling party outputs the audio reply "No registrant is found" (Sc4 (Sc2—Yes)).

When the registrant ID is detected, the situation of the intended person is determined based on the registrant ID of the intended person with reference to FIG. 13. For example, in his/her room?/in another room?/away from home? (determine situation of intended person with reference to registrant situation table based on registrant ID of calling destination (intended person)). The communication route from the utterer to the intended person is specified based on the situation (specify communication route from utterer to intended person with reference to move destination determination table based on various conditions) shown in FIG. 13 (Sc3 (Sc2—No)).

The process for specifying the communication route is performed in accordance with various situations. When it is determined that the device of the intended person (registrant ID) is a communication device with reference to FIG. 13, the communication route is formed between the communication device of the calling party and the communication device (forming communication route between recognized device in registrant situation table and device of calling party) of the intended party (Sc5).

When it is determined that the device of the intended person (registrant ID) is a portable terminal using Wi-Fi communication for a call (communication connecting to IP address for Wi-Fi communication) with reference to FIG. 13, the communication route is formed with an IP address between the communication device of the calling party and the portable terminal of the intended person (Sc6).

When it is determined that the device of the intended person (registrant ID) is a portable terminal using its telephone number for a call with reference to FIG. 13, the communication route is formed with the telephone number of the portable terminal of the intended person between the communication device of the calling party and the portable terminal of the intended person (Sc7).

When the location of the intended person cannot be specified with reference to FIG. 13, the communication device of the calling party is controlled so as to output the audio reply "Location is unclear".

Figure 8:
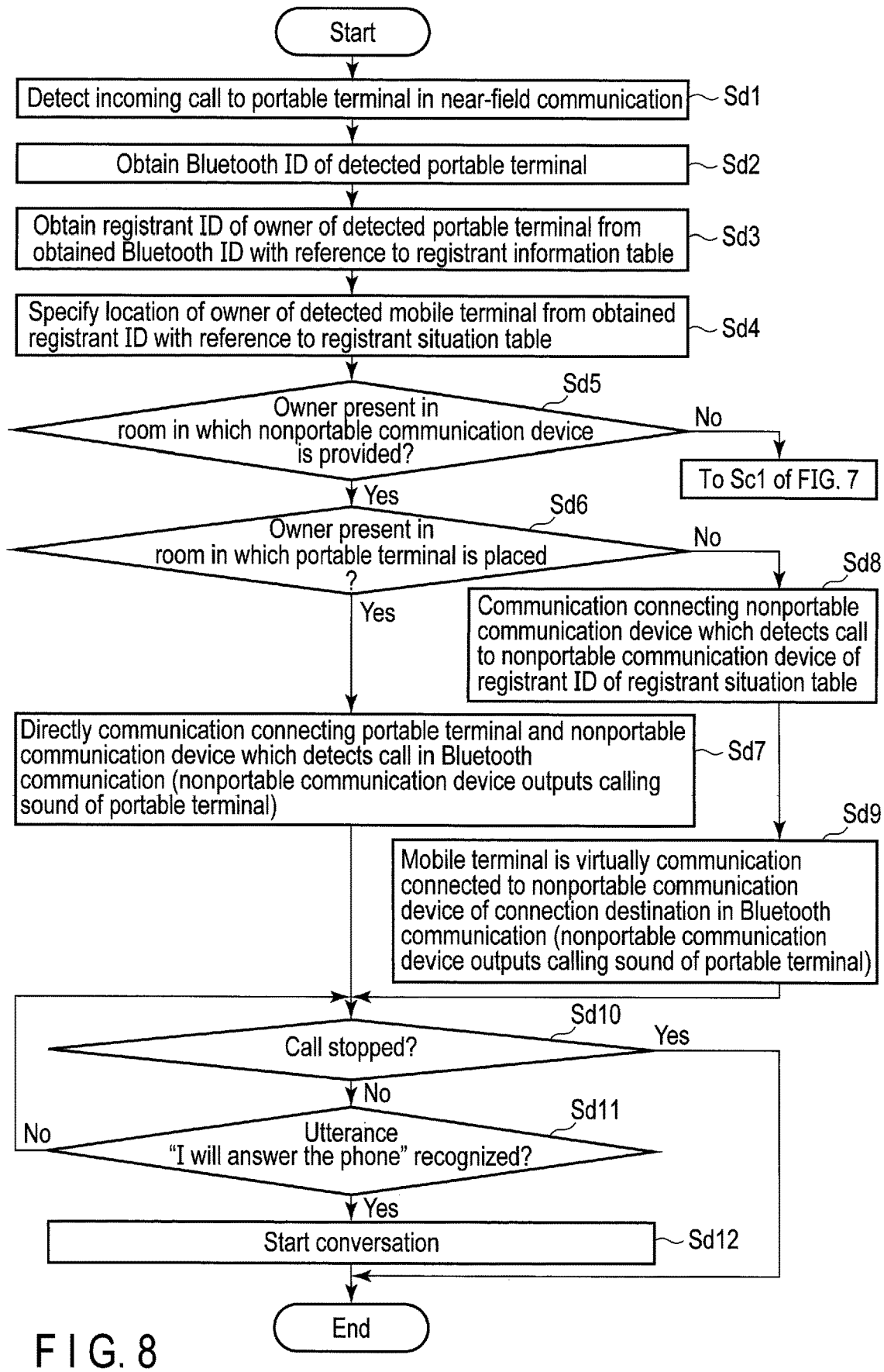
FIG. 8 is a flowchart showing another example of the operation of the communication system.

FIG. 8 is a flowchart showing another example of the operation of the communication system. In the above description, this specification mainly explains examples in which a communication route is formed from a communication device to another communication device or an external portable terminal, etc.

Further, the communication system is capable of outputting sound from each communication device or portable terminal based on the situation of the receiver (the intended person).

Each communication device is capable of detecting an incoming call to a portable terminal in accordance with near-field communication (Sd1). At this time, the communication device obtains the Bluetooth ID of the portable terminal (Sd2). Subsequently, the registrant ID of the owner of the detected portable terminal is obtained from the obtained Bluetooth ID with reference to the registration information shown in FIG. 12 (Sd3).

Subsequently, the communication system specifies the location of the owner of the detected portable terminal based on the obtained registrant ID with reference to the situation data shown in FIG. 13 (Sd4). Subsequently, the communication system determines whether the nonportable communication device which detects the incoming call (owner present in room in which nonportable communication device) is provided in the specified location (Sd5). When the owner of the portable terminal is present near the communication device which detects the incoming call (or in the room) (Sd6 (Sd5—Yes)), the portable terminal is directly communication connected to the nonportable communication device in accordance with Bluetooth communication (directly communication connecting portable terminal and nonportable communication device which detects call in Bluetooth communication). The calling sound and voice received in the portable terminal may be output from the nonportable communication device which detects the incoming call (Sd7 (Sd6—Yes)).

When the owner of the portable terminal is present near a nonportable communication device different from the nonportable communication device which detects the call in block Sd6—No, the communication system forms a communication route with the nonportable communication device different from the nonportable communication device which detects the call. The communication system causes the different nonportable communication device to output the calling sound and voice received in the portable terminal (Sd8 and Sd9).

When the above communication route is formed, the communication system determines whether or not the call is stopped (Sd10). When the communication route is maintained, the communication system determines whether or not conversation ("I will answer the phone" recognized?) is started (Sd11 (Sd10—No)). If conversation is started, the communication system determined that the call is in progress (Sd12). If the communication system determines that the call is stopped (Sd10—Yes), the communication is terminated.

When the communication system determines that the owner of the portable terminal is not present in the room in which the communication device is provided in block Sd5—No, the process moves to block Sc1 shown in FIG. 7. The process of FIG. 7 begins with checking the registrant ID again. The situation of the intended person (location, unclear) is determined. A communication route is formed. When the intended person is not registered, the device of the calling party outputs the audio reply "No registrant is found", etc.

Figure 17:
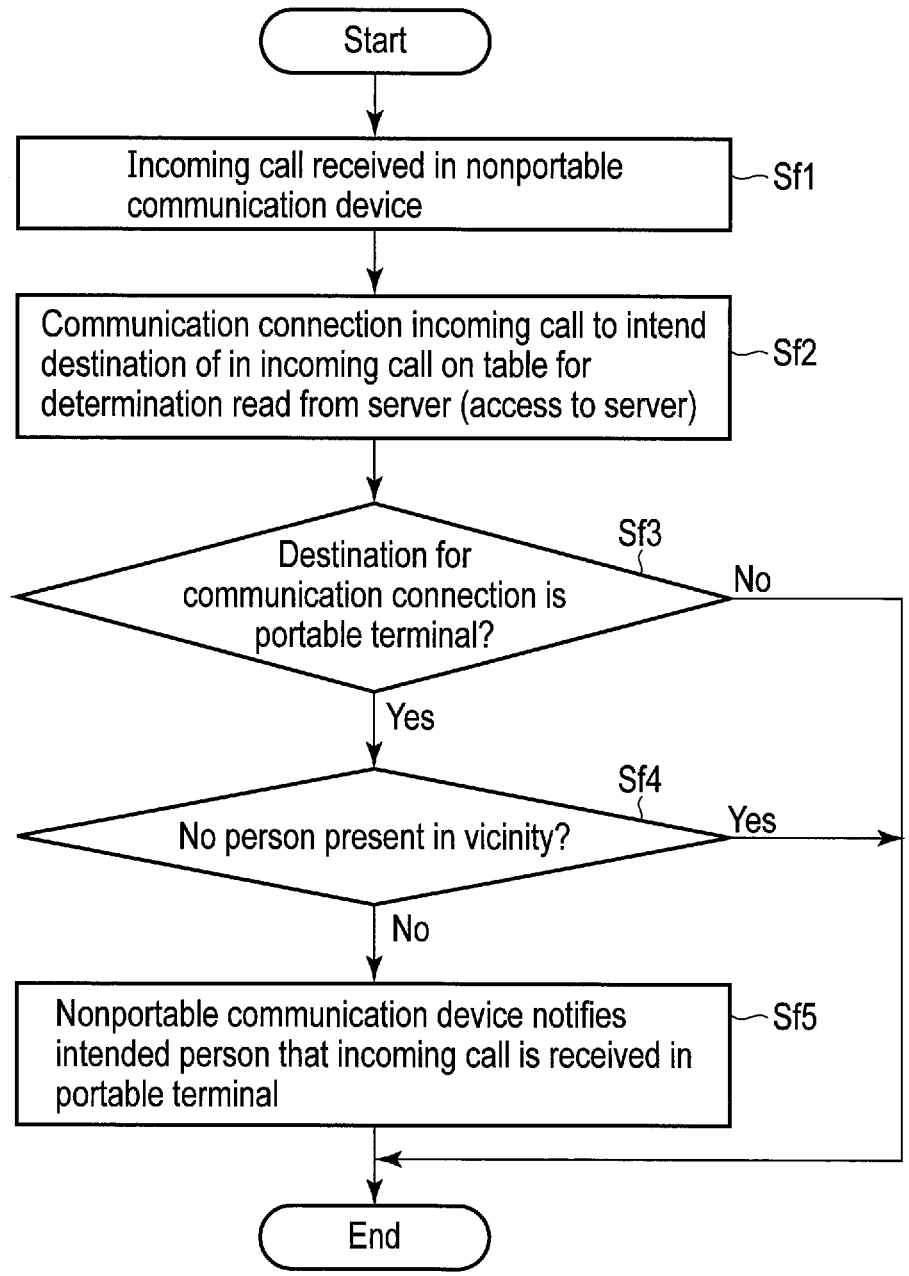
FIG. 17 is a flowchart for determining the transmission route (call/communication connection destination) of communication based on the situation of the location of the intended person when the communication system of the present embodiment specifies the location of the intended person and forms a communication route.

As shown in FIG. 16, for example, a call received in a portable terminal (the portable phone held by the target owner) may be transmitted to (received in) a communication device (nonportable communication device) 11 located near the owner to realize communication in a handsfree state through the nonportable communication device (communication device) 11 depending on the environment of the target owner. As shown in FIG. 17, a call received in a nonportable communication device 11 located near the owner may be transmitted to (received in) the portable terminal (portable phone) held by the owner to realize communication in a non-handsfree state for prompting the owner to use his/her portable terminal.

As shown in FIG. 16 or FIG. 17, when an incoming call to the target person is received in the portable terminal of the target person or in a nonportable communication device 11 located near the target person, the communication system refers to the call/communication connection destination determination table shown in FIG. 15. In line with FIG. 15, the communication system prompts communication via the device which receives the call, or connects the call received in the handsfree device to the non-handsfree device or connects the call received in the non-handsfree device to the handsfree device.

More specifically, as shown in FIG. 15, when the device which receives a call is a portable terminal using a public telecommunication network [1], the communication system determines whether a nonportable communication device is provided near the portable terminal. When no nonportable communication device is provided [10], the portable terminal notifies the target person of the reception of the call (the connection is not changed).

When a nonportable communication device is presented [11], the number of people present near the nonportable communication device is determined.

[11A] When the number of people present near the nonportable communication device is one (in other words, when only the target person is present), the call is connected to the nonportable communication device (in other words, the call received in the portable terminal is connected to the nonportable communication device to perform handsfree communication by the speaker and microphone of the nonportable communication device).

[11B] When the number of people present near the nonportable communication device is two or more (in other words, when at least one person is present other than the target person), the call is not connected to the nonportable communication device (in other words, the call received in the portable terminal is straightly connected to the portable terminal to perform non-handsfree communication by the portable terminal).

[11C] When the nonportable communication device does not includes a capture function (camera module), or when the number of people present near the nonportable communication device cannot be detected since the capture function is turned off, the call is not switched (connected) to the nonportable communication device (in other words, the call received in the portable terminal is straightly connected (stay incoming call) to the portable terminal to perform non-handsfree communication by the portable terminal).

In this way, when a call to the person who holds the target portable terminal is received, and further when only the target person is present in the place, the target person can answer the call received in the portable terminal in a handsfree state using the nonportable communication device. When at least another person is present around the target person, the target person can answer the call in a non-handsfree state using the portable terminal such that the communication content is not heard by the surrounding people.

When, for example, the nonportable communication device detects that another person present around the target person is a child, especially, a baby, the handsfree state by the nonportable communication device is maintained. However, when the baby starts crying during the response to the communication, the handsfree state may be switched to a non-handsfree response using the portable terminal by a button displayed by the touchpanel of the portable terminal or a voice instruction.

When, for example, another person present around the target person is a child, and further when the call is made by the father who is away from home to the whole family (including the child), the state may be switched to a handsfree response using the nonportable communication device by a button displayed by the touchpanel of the portable terminal or a voice instruction.

When, for example, another person present around the target person is a close friend, and further when the call is made by booked commercial facilities, the state may be switched to a handsfree response using the nonportable communication device by a button displayed by the touchpanel of the portable terminal or a voice instruction.

When nobody is present around the target person (communication is possible in a handsfree state), but when, for example, the nonportable communication device detects that a program or content distributed via a network is reproduced by a television receiver or the target person enjoys music by an audio device, the state is not switched to a handsfree response using the nonportable communication device (the connection is not changed [the portable terminal notifies the target person of the reception of the call]). Note that, a program or content distributed via a network is reproduced by a television receiver, or when the target person enjoys music by an audio device, the conversation of people can be identified by features that, for example, the direction of the sound source is fixed, or audio signals are continued in a constant frequency band.

When nobody is present around the target person (communication is possible in a handsfree state), but when, for example, a camera module provided in the entrance detects a visitor, the state is not switched to a handsfree response using the nonportable communication device (the connection is not switched [the portable terminal notifies the target person of the reception of the call]), or the state is changed from a handsfree response to a non-handsfree response using the portable terminal. In this case, a handsfree response can be set when the camera module detects that the visitor goes home (in other words, the visitor goes out of the entrance) (when the state is changed to a non-handsfree response during a handsfree response, the state can be returned to a handsfree response).

When the device which receives a call is a nonportable communication device via a LAN (Wi-Fi) [2], whether the target portable terminal (transmission target) is present near the nonportable communication device is determined. When the portable terminal is not present [20], the call is straightly output from the nonportable communication device (the connection is not switched (changed)).

[21] When the portable terminal is present, the number of people present near the nonportable communication device is determined.

[21A] When the number of people present near the nonportable communication device is one (in other words, only the target person is present), the call is not connected to the portable terminal (in other words, a handsfree state using the speaker and microphone of the nonportable communication device is maintained).

[21B] When the number of people present near the nonportable communication device is two or more (in other words, when a person is present other than the target person), the call is connected to the portable terminal (in other words, the call is connected to the portable terminal of the intended person [in a non-handsfree state], stopping the communication in a handsfree state using the speaker and microphone of the nonportable communication device).

[21C] When the nonportable communication devide does not includes a capture function (camera module), or when the number of people present near the nonportable communication device cannot be detected as the capture function is turned off, the call is not connected to the portable terminal of the intended person (the call received in the nonportable communication device is connected to the portable terminal of the intended person to perform communication in a non-handsfree state by the portable terminal).

As the situation of the call destination, whether only the target person (intended person) is present in the vicinity is determined in priority to the image of the camera module of the nonportable communication device. However, as described above, the camera module of the nonportable communication device may not operate, or the nonportable communication device may not includes a camera module. In this case, when another camera module is presented in the vicinity, the image from this camera module may be used. Even when the nonportable communication device does not includes a camera module, whether another person is present around the intended person may be determined based on, for example, the result of detection of the sound around the intended person (the speech of another person) by the microphone.

When nobody is present around the target person (in other words, communication is possible in a handsfree state), but when, for example, the nonportable communication device detects that a program or content distributed via a network is reproduced by a television receiver or the target person enjoys music by an audio device, the portable terminal preferably notifies the target person of the reception of the call such that the state is switched from a handsfree response using the nonportable communication device to a response using the portable terminal.

In the above manner, when a nonportable communication device capable of collecting sound with a microphone and outputting sound with a speaker is provided near the person who holds a portable terminal, and further when a person is present near the nonportable communication device other than the intended person (the owner of the portable terminal), it is possible to connect the call received in the nonportable communication device to the portable terminal and answer the call in a non-handsfree state using the portable terminal such that the communication content is not heard by the surrounding people. When the intended person holds the portable terminal, and further when a call is received in a nearby nonportable communication device, and further when it is noisy around the nonportable communication device (the owner of the portable terminal), the communication in a handsfree state via the nonportable communication device is difficult. Thus, the call received in the nonportable communication device is connected to the portable terminal held by the intended person. In this way, the intended person can easily recognize the communication content received in the nonportable communication device (in other words, the intended person can catch the communication content on desirable conditions).

Specific examples are shown below.

Example 9

For example, when a child speaks "I want to speak to mom (Where is mom?/Mom?)" in the child's room, a communication route is established between the nonportable communication device of the living room in which the mother is present and the nonportable communication device of the child's room. When a person is present other than the mother in the living room, the communication device provided in the living room connects the call to the portable terminal of the mother in accordance with, for example, Bluetooth. When only the mother is present in the living room, the communication device provided in the living room establishes a communication route such that the mother can have a conversation with the child (children) present in the child's room in a handsfree state by the microphone and speaker.

In line with the communication connection destination determination shown in FIG. 15, for example, when a portable terminal (portable phone, etc.) and a nonportable handsfree communication device (an intercom, a security camera module comprising a communication function, etc.) are present in the vicinity, the surrounding situation (the presence or absence of people including himself/herself, noisy or silent, etc.) is recognized by sensors such as a camera module and a microphone. It is possible to automatically connect a call to one of the portable terminal and the nonportable communication device depending on the situation.

Example 10

For example, when a call (communication) is received in the portable terminal of the mother present in the living room, and further when only the mother is present in the living room, the call is transferred from the portable terminal of the mother to the nonportable communication device provided in the living room via a device using near-filed communication such as Bluetooth. In this way, the mother can answer the call received in her portable terminal in a handsfree state. When a person is present in the living room other than the mother, the call is maintained in the portable terminal (as it is).

When a call is received in a portable terminal, and further when nobody is present around the owner of the portable terminal, the owner can answer the call in a handsfree state by connecting the call to the nonportable communication device provided in the room (place) in which the owner is present.

Example 11

For example, when a call (communication) is received in the nonportable communication device provided in the living room as the nonportable communication device recognizes that the mother is present in the living room, and further when only the mother is present in the living room, handsfree communication can be realized by connecting the call to the nonportable communication device of the living room. When a person is present in the living room other than the mother, the call is transferred from the nonportable communication device of the living room to the portable terminal of the mother via a device using near-field communication such as Bluetooth.

When a call is received in the nonportable communication device provided in the place (room) in which the owner of a portable phone is present, and further when nobody is present around the owner of the portable phone, the owner can answer the call in a handsfree state by connecting the call to the nonportable communication device provided in the room (place) in which the owner is present (by maintaining the communication route to the nonportable communication device). When another person is present in the living room other than the owner, it is possible to prevent the person other than the owner from undesirably recognizing the communication content by connecting the call to the portable terminal of the owner (by changing the communication connection destination).

Example 12

For example, when a nonportable communication device recognizes that the mother is present in the living room, and further when a call (communication) is received in the portable terminal of the mother, and further when a person is present in the living room other than the mother, the call is connected to the portable terminal of the mother. The nonportable communication device provided in the living room notifies the mother of the call received in the portable terminal of the mother. For example, the audio message "Call for mom was received/You got a call" is output by the audio output function of the nonportable communication device provided in the living room. In this way, the mother can easily notice the call received in her portable terminal.

When a nonportable communication device detects that the owner holding the portable terminal owned by the intended person and a person other than the owner are present, and further when a call is received in the portable terminal, the call is connected to the portable terminal. In this way, the nonportable communication device is capable of notifying the owner of the call received in the portable terminal.

In examples 9 to 12, when it is clear that only the intended person is present near the nonportable communication device, but when it is noisy, etc., all the calls are preferably connected to the portable terminal owned by the intended person.

FIG. 16 and FIG. 17 show the above explanation regarding FIG. 15 in a software manner. FIG. 16 shows an example for determining the communication connection destination when a call is received in the portable terminal held by the intended person (the owner of the portable terminal). FIG. 17 shows an example for determining the communication connection destination when a call is received in a nonportable communication device provided near the intended person (the owner of a portable terminal).

As shown in FIG. 16, when a call is received in the portable terminal held by the intended person (the owner of the portable terminal) (Se1), the portable terminal is regarded as the communication connection destination by accessing the call/communication connection destination determination table held by the server 50 and shown in FIG. 15 (Se2). Subsequently, whether a nonportable communication device is provided near the portable terminal is determined (Se3).

When the provision of a nonportable communication device near the portable terminal of the connection target is detected (Se3—YES), and further when the nonportable communication device detects that a person is present near the nonportable communication device other than the intended person (Se4—YES), the nonportable communication device notifies the intended person that the call is received in the portable terminal of the intended person (Se5). The notification of the reception of the call (in the portable terminal) may be performed by, for example, audio output from the speaker of the nonportable communication device or blinking in the place by the control of the nonportable communication device. For example, when a television device is provided, and further when the television device reproduces a program or content, a message indicating the reception of the call (in the portable terminal) may be displayed.

When the nonportable communication device 11 provided near the portable terminal detects that nobody is present near the nonportable communication device 11 other than the intended person (Se4—NO), or when no nonportable communication device is provided near the portable terminal (Se3—NO), the connection to the communication connection destination shown in FIG. 15 is maintained.

As shown in FIG. 17, when a call for the intended person (the owner of a portable terminal) is received in a nonportable communication device (Sf1), the communication connection destination is determined by accessing the call/communication connection destination determination table held by the server 50 and shown in FIG. 15 (Sf2).

Subsequently, when the communication connection destination is a portable terminal (Sf3—YES), whether or not a person is present other than the intended person (the owner of the portable terminal) is determined by the nonportable communication device provided near the intended person holding the portable terminal (Sf4).

When the presence of a person other than the intended person near the portable terminal is detected (Sf4—YES), the nonportable communication device notifies the intended person that the call is received in the portable terminal of the intended person (Sf5). In a manner similar to that of FIG. 16, for example, the notification of the reception of the call (in the portable terminal) may be performed by audio output from the speaker of the nonportable communication device or blinking in the place by the control of the nonportable communication device. For example, when a television device is provided, and further when the television device reproduces a program or content, a message indicating the reception of the call (in the portable terminal) may be displayed.

Figure 9:
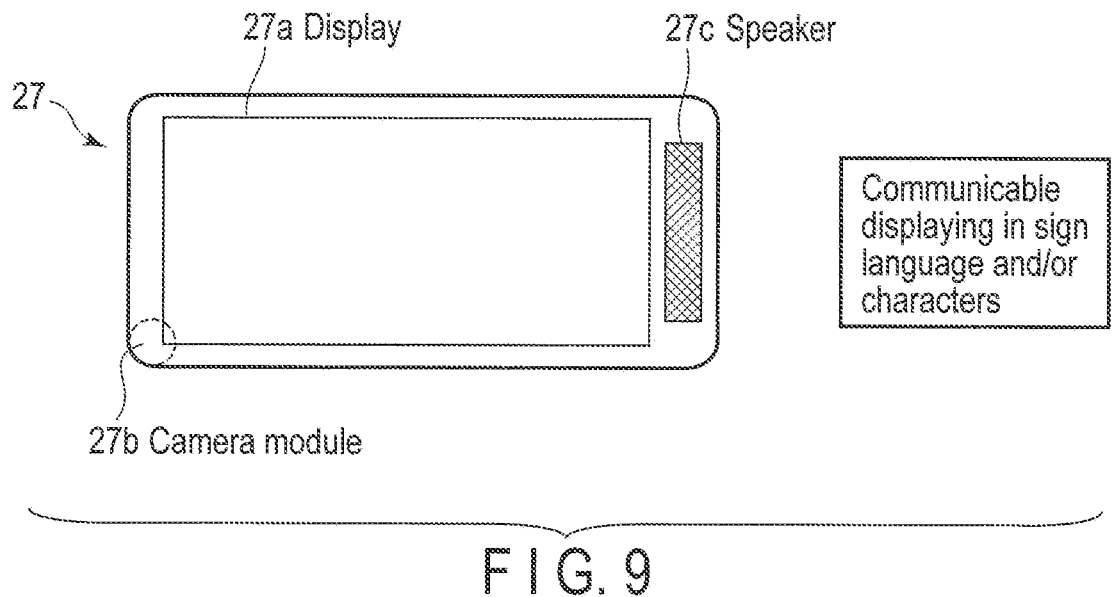
FIG. 9 shows another example of a communication device or special portable terminal.

FIG. 9 shows a communication device or portable terminal 27 according to another embodiment. This communication device or portable terminal 27 has a dialogue application for receiving image data from the partner and transmitting image data. Thus, the communication device or portable terminal 27 comprises at least a display 27a, a camera module 27b and a speaker 27c.

When the communication device comprises the above function, the utterer can communicate with the partner displaying in sign language and/or characters, etc.

Figure 10:
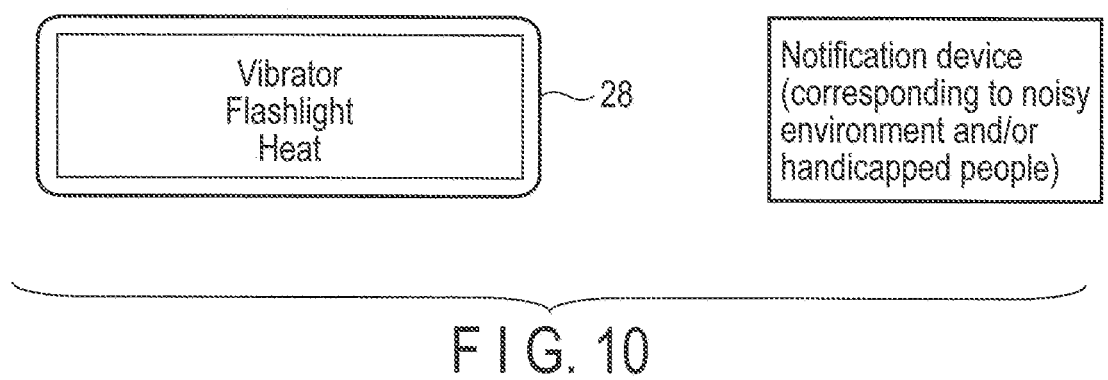
FIG. 10 shows a modification example of a special portable terminal.

FIG. 10 shows an example of a notification device 28. When the user, works in noisy environment, held the communication device shown in FIG. 9, the user may not notice an incoming call, for example. When a call is received in the communication device or portable terminal 27, the notification device 28 is capable of notifying the user of the call by vibration (with a vibrator), light flash (with a light-emitting unit), heat (with a mechanism for increasing the temperature) or a combination thereof in cooperation.

Figure 11:
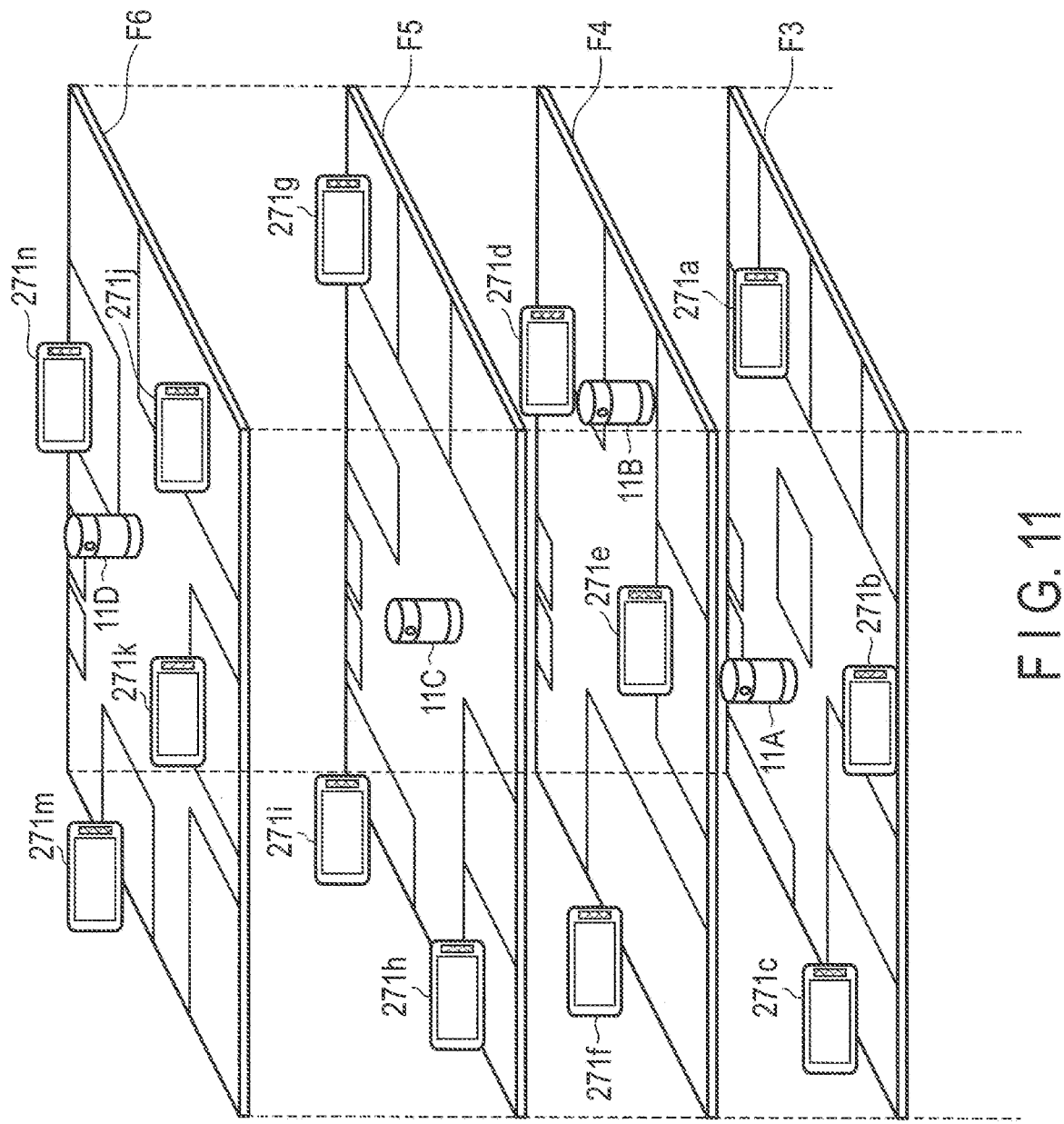
FIG. 11 is an explanatory diagram showing a usage example when the communication system is specifically introduced into a department store, a plant, etc.

FIG. 11 shows a conceptual diagram when the above electronic device and method are used in a department store (large-scale commercial facilities), a plant, etc.

In the electronic device and method shown in FIG. 11, communication devices 11A, 11B, 11C and 11D may be communication connected to outside by specifying one of arbitrary portable terminals (or intercoms or IP telephones mainly used in a closed area) 271a to 271k, 271n and 271m located on arbitrary floors F3, F4, F5 and F6.

Thus, it is possible to provide, for example, sound and signals based on specific rules by specifying an area instead of an announcement over the whole building. For example, in a department store, it is possible to contact the employees, or play BGM unique to each shop. In a plant, it is possible to independently send a message as an operation instruction to the employees based on each area, also.

The example shown in FIG. 11 is also applicable to a station, a shopping mall, an underground shopping complex, etc., as a matter of course. To detect a specific portable terminal, the floor or the specific block on the floor to which an announcement should be made can be detected from the image or sound specified by the camera module of communication device 11A, 11B, . . . , of each floor. The communication may be one-way communication like the above announcement in a building.

As shown in FIG. 11, for example, when an arbitrary number of floors or a plurality of blocks (sections) are included, such as large-scale commercial facilities (a department store or a shopping mall, or the like), a plant or storage, even when the intended person brings a portable terminal with him/her, and the presence of a communication device (or a nonportable communication device) near the intended person is recognized (a communication route is established for a target nonportable communication device), it is desirable that a call received in the target portable terminal not be connected to the nearby communication device. Even if the call received in the target portable terminal is connected to the nearby communication device, it is imaginably difficult to realize handsfree conversation via the communication device as it is noisy around the person holding the target portable terminal.

Therefore, based on the call/communication connection destination determination table shown in FIG. 15 and the flow shown in FIG. 16, for example, calls received in portable terminals are connected to the portable terminal held by each target person. Similarly, based on the call/communication connection destination determination table shown in FIG. 15 and the flow shown in FIG. 17, for example, overall announcement or calls received in communication devices may be connected to the portable terminal held by each target person.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus capable of communicating with a second electronic apparatus of a first user, the electronic apparatus comprising:
   a receiver configured to receive a request of a call with the first user from a second user and to receive a signal of sound of the second user during the call between the first user and the second user;
   electronic circuitry configured to determine whether the sound of the second user is output by the electronic apparatus or the second electronic apparatus, using at least one of an image of around the first user and sound of around the first user;
   a speaker configured to output the sound of the second user and a signal to indicate that a call is received in the second electronic apparatus, if it is determined that the sound of the second user is output by the electronic apparatus; and
   a transmitter configured to transmit the signal of the sound of the second user to the second electronic apparatus, if it is determined that the sound of the second user is output by the second electronic apparatus.

2. The electronic apparatus of claim 1, wherein the electronic circuitry is configured to determine that the sound of the second user is output by the second electronic apparatus, if a person other than the first user is present around the first user, and wherein the electronic apparatus is used in a handsfree call.

3. An electronic apparatus capable of communicating with a second electronic apparatus of a first user, the electronic apparatus comprising:
   a receiver configured to receive a request of a call with the first user from a second user and to receive a signal of sound of the second user during the call between the first user and the second user;
   electronic circuitry configured to determine whether the sound of the second user is output by the electronic apparatus or the second electronic apparatus, using at least one of an image of around the first user and sound of around the first user; and to determine that the sound of the second user is output by the second electronic apparatus, if no person is present around the first user other than the first user, and wherein the electronic apparatus is used in a non-handsfree call;

a speaker configured to output the sound of the second user, if it is determined that the sound of the second user is output by the electronic apparatus; and a transmitter configured to transmit the signal of the sound of the second user to the second electronic apparatus, if it is determined that the sound of the second user is output by the second electronic apparatus.

4. A method comprising:

receiving a request of a call with the first user from a second user and to receive a signal of sound of the second user during the call between the first user and the second user;

determining whether the sound of the second user is output by the electronic apparatus or the second electronic apparatus, using at least one of an image of around the first user and sound of around the first user;

outputting the sound of the second user and a signal to indicate that a call is received in the second electronic apparatus, if it is determined that the sound of the second user is output by the electronic apparatus; and transmitting the signal of the sound of the second user to the second electronic apparatus, if it is determined that the sound of the second user is output by the second electronic apparatus.

5. The method of claim 4, wherein determining that the sound of the second user is output by the second electronic apparatus, if a person other than the first user is present around the first user, and is using the electronic apparatus.

6. The method of claim 4, wherein determining that the sound of the second user is output by the second electronic apparatus, if no person is present around the first user other than the first user, and is using he electronic apparatus in a non-handsfree call.

* * * * *